(12) United States Patent
Koga

(10) Patent No.: US 10,777,906 B2
(45) Date of Patent: Sep. 15, 2020

(54) ANTENNA DEVICE AND ELECTRONIC APPARATUS

(71) Applicant: FUJITSU LIMITED, Kawasaki-shi, Kanagawa (JP)

(72) Inventor: Yohei Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/985,791

(22) Filed: May 22, 2018

(65) Prior Publication Data

US 2018/0342812 A1     Nov. 29, 2018

(30) Foreign Application Priority Data

May 25, 2017    (JP) ................................. 2017-103907

(51) Int. Cl.
| | |
|---|---|
| *H01Q 19/10* | (2006.01) |
| *H01Q 1/32* | (2006.01) |
| *H01Q 1/38* | (2006.01) |
| *H01Q 7/00* | (2006.01) |
| *B60R 11/02* | (2006.01) |
| *H01Q 1/52* | (2006.01) |

(52) U.S. Cl.
CPC ............. *H01Q 19/10* (2013.01); *B60R 11/02* (2013.01); *H01Q 1/32* (2013.01); *H01Q 1/52* (2013.01); *H01Q 7/00* (2013.01); *H01Q 1/38* (2013.01)

(58) Field of Classification Search
CPC ............ H01Q 19/10; H01Q 1/52; H01Q 7/00; H01Q 1/32; H01Q 1/38; B60R 11/02
See application file for complete search history.

(56) References Cited

U.S. PATENT DOCUMENTS

| | | | | |
|---|---|---|---|---|
| 2,818,562 | A * | 12/1957 | Carter ................... | H01Q 21/08 343/742 |
| 5,198,826 | A * | 3/1993 | Ito ........................... | H01Q 1/38 343/713 |
| 2008/0018547 | A1 | 1/2008 | Iwasaki | |
| 2011/0063180 | A1 * | 3/2011 | Su ............................ | H01Q 7/00 343/795 |

FOREIGN PATENT DOCUMENTS

| | | |
|---|---|---|
| JP | 03-114303 | 5/1991 |
| JP | 2004-088748 | 3/2004 |
| JP | 2006-013798 | 1/2006 |
| JP | 2013-090246 | 5/2013 |

\* cited by examiner

*Primary Examiner* — Hai V Tran
*Assistant Examiner* — Michael M Bouizza
(74) *Attorney, Agent, or Firm* — Fujitsu Patent Center

(57) ABSTRACT

An antenna device includes: a first loop antenna including a first end portion and a second end portion that are fed, and having a first length corresponding to N times a wavelength at a communication frequency; a second loop antenna having a second length corresponding to N times the wavelength; a first connecting conductor configured to couple the first loop antenna and the second loop antenna to each other at a first position of a third length corresponding to M times a quarter wavelength at the communication frequency from the first end portion of the first loop antenna; and a second connecting conductor configured to couple the first loop antenna and the second loop antenna to each other at a second position of the third length from the second end portion of the first loop antenna and different from the first position.

18 Claims, 31 Drawing Sheets

100A

110~140

ANTENNA DEVICE AND ELECTRONIC APPARATUS

CROSS-REFERENCE TO RELATED APPLICATION

This application is based upon and claims the benefit of priority of the prior Japanese Patent Application No. 2017-103907, filed on May 25, 2017, the entire contents of which are incorporated herein by reference.

FIELD

The embodiment discussed herein is related to an antenna device and an electronic apparatus.

BACKGROUND

An antenna device is used.
A related technology is disclosed in Japanese Laid-open Patent Publication No. 03-114303.

SUMMARY

According to an aspect of the embodiment, an antenna device includes: a first loop antenna including a first end portion and a second end portion that are fed, and having a first length corresponding to N (N is an integer of 1 or more) times a wavelength at a communication frequency; a second loop antenna having a second length corresponding to N times the wavelength; a first connecting conductor configured to couple the first loop antenna and the second loop antenna to each other at a first position of a third length corresponding to M (M is an integer of 1 or more) times a quarter wavelength at the communication frequency from the first end portion of the first loop antenna; and a second connecting conductor configured to couple the first loop antenna and the second loop antenna to each other at a second position of the third length from the second end portion of the first loop antenna and different from the first position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, a wide band loop antenna (antenna device) includes a plurality of loop-shaped antenna conductors and short-circuit lines. The loop-shaped antenna conductors are arranged so as to constitute multiple loops on an insulating surface, and coupled in parallel to a common feeding point. The short-circuit lines short-circuit and couple each of the loop-shaped antenna conductors at positions other than that of the above-described parallel connection.

A wider band of the antenna device is achieved by performing feeding from the common feeding point to the plurality of loop-shaped antenna conductors. However, a degradation in radiation characteristics of the antenna device when the antenna device approaches a conductor may not be reduced. Without being limited to cases where the antenna device approaches a conductor, the radiation characteristics of the antenna device may not be set so as to provide desired communication characteristics according to a distance to the conductor.

As an example, an antenna device that provides desired communication characteristics according to a distance to a conductor may be provided.

Figure 1:
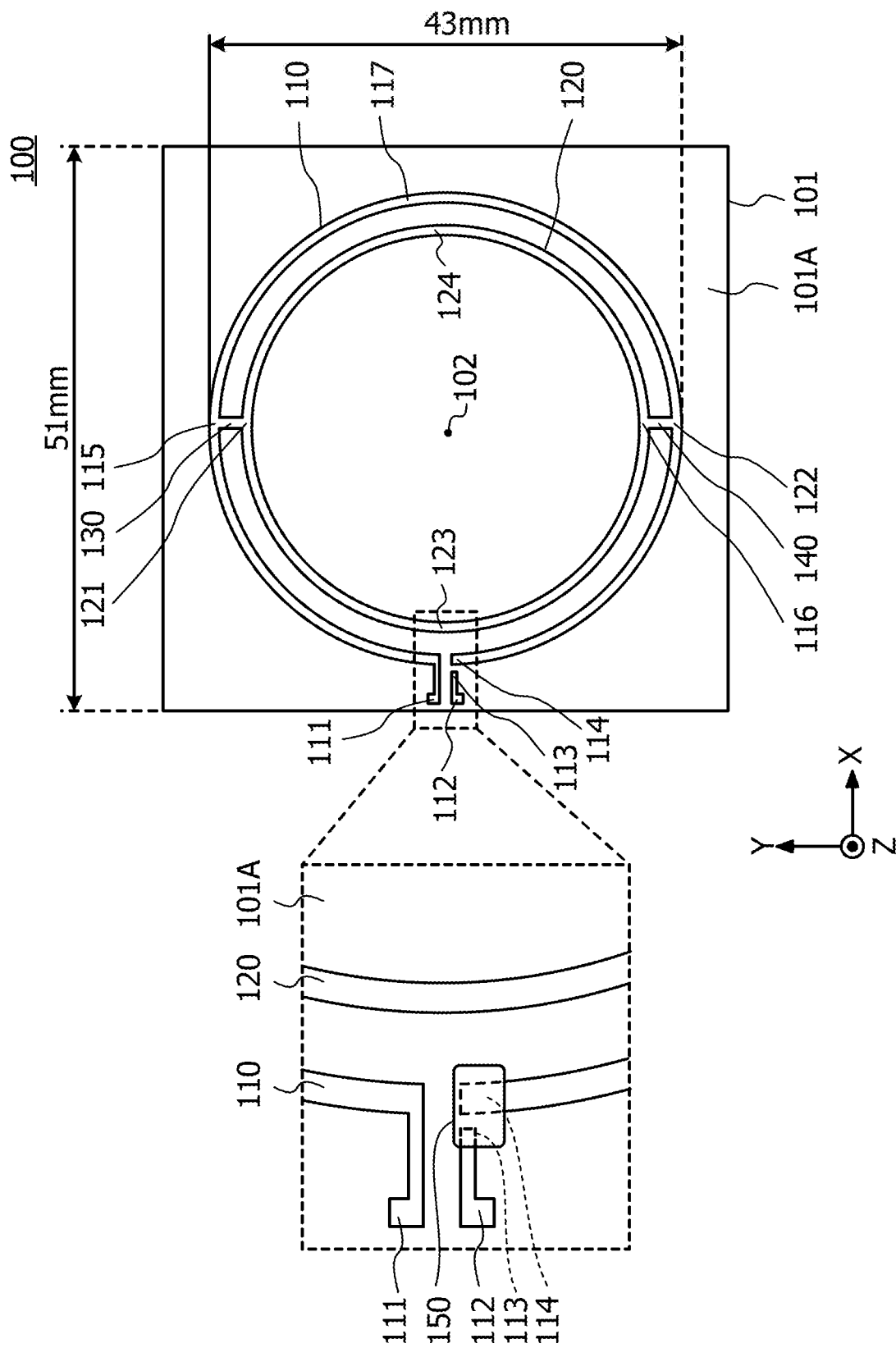
FIG. 1 illustrates an example of an antenna device.
Figure 2:
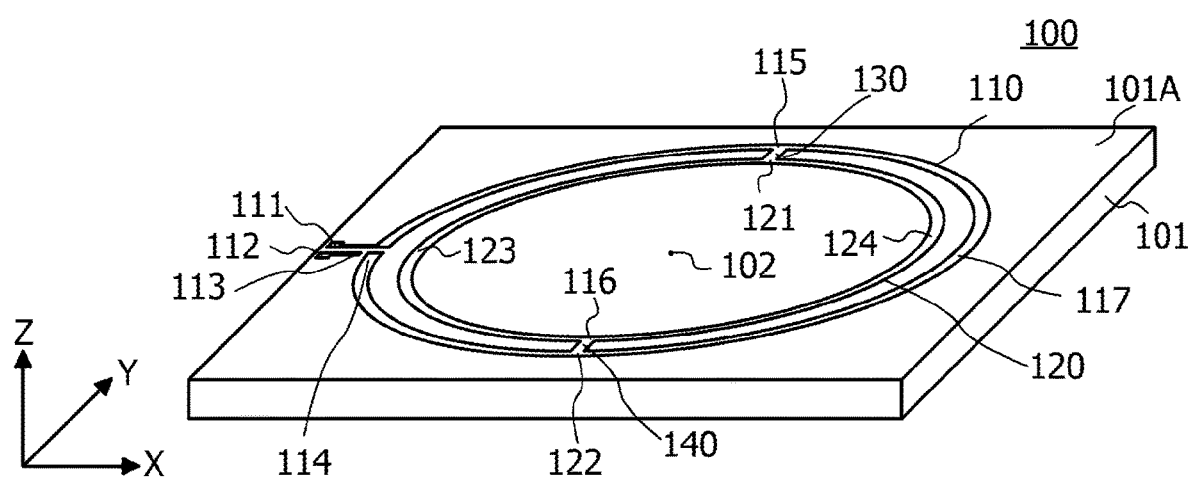
FIG. 2 illustrates an example of an antenna device.

FIG. 1 and FIG. 2 illustrate an example of an antenna device. FIG. 1 illustrates a plan view (right) and an enlarged view (left). FIG. 2 illustrates a perspective view. The following description will be made using an XYZ coordinate system. Viewing in plan represents viewing in an XY plane.

An antenna device 100 is, as an example, an antenna device having a communication frequency (resonance frequency) of 2.4 GHz. The antenna device 100 may, for example, be attached to a sensor device for Internet of things (IoT), and used to transmit various information detected by the sensor device or the like to another antenna device 100, a server, or the like. Such a sensor device may be installed in various locations such as a location near a conductor (metallic conductor or a conductor other than metal), a location near a nonconductor (insulator), and the like.

In the following, the antenna device 100 has desired radiation characteristics and exhibits excellent communication characteristics even when installed in the vicinity of a conductor. The following description will be made principally of a case where the conductor is a metal, for example. However, the conductor is not limited to a metal. Without being limited to the vicinity of the conductor, the antenna device 100 or the like has desired radiation characteristics and exhibits excellent communication characteristics even when installed at a location distant from the conductor.

The antenna device 100 includes a board 101, loop antennas 110 and 120, connecting portions 130 and 140, and a matching circuit 150. The board 101, the loop antennas 110 and 120, the connecting portions 130 and 140, and the matching circuit 150 are arranged on a top surface 101A on a Z-axis positive direction side of the board 101. The matching circuit 150 is illustrated only in the enlarged view on the left side of FIG. 1.

It suffices for the board 101 to be a board made of an insulator. An insulating layer for a wiring board of the flame retardant type 4 (FR4) standard or a flexible board such as polyimide or the like may be used as the board 101. As an example, an insulating layer for a wiring board of the FR4 standard may be used.

In a case where an insulating layer for a wiring board of the FR4 standard is used as the board 101, the loop antennas 110 and 120 and the connecting portions 130 and 140 are fabricated by patterning a copper foil disposed on the top surface 101A of the board 101 by etching processing. As an example, lengths in an X-axis direction and a Y-axis direction of the board 101 are 51 mm.

The loop antenna 110 includes two end portions 111 and 112, and is a loop antenna that is circular as viewed in plan with the end portions 111 and 112 as both ends thereof. As an example, the diameter of the loop antenna 110 is 43 mm, and the line width of the loop antenna 110 is 1 mm.

The loop antenna 110 includes end portions 113 and 114 for inserting the matching circuit 150 in series, the end portions 113 and 114 being in the vicinity of the end portion 112. The loop antenna 110 is broken between the end portions 113 and 114, which are coupled to each other by the matching circuit 150. The loop antenna 110 is an example of a first loop antenna.

The loop antenna 110 is coupled to the loop antenna 120 via the connecting portions 130 and 140. A length from the end portion 111 to the end portion 112 of the loop antenna 110 is set at a length corresponding to an electrical length of one wavelength at a communication frequency (2.4 GHz). The length of the loop antenna 110 is an example of a first length.

The length corresponding to the electrical length of one wavelength is not limited to a length equal to the electrical length of one wavelength, and also denotes lengths including a length set slightly shorter or longer than the electrical length of one wavelength in order to adjust the impedance of the loop antenna 110.

The loop antenna 110 is fed at the end portions 111 and 112. In a case where feeding is performed by using a coaxial cable, for example, a core wire is coupled to one of the end portions 111 and 112, and a shielding wire is coupled to the other of the end portions 111 and 112. The loop antenna 110 is thus fed by coupling an alternating current (AC) power source of 2.4 GHz to the end portions 111 and 112. When the loop antenna 110 is fed, a current flows also through the loop antenna 120.

The loop antenna 120 is disposed inside the loop antenna 110 as viewed in plan, and is a circular loop antenna including no end portions. The loop antenna 120 is disposed concentrically with the loop antenna 110 in a state in which a center 102 of the loop antenna 110 coincides with that of the loop antenna 120 as viewed in plan. As an example, the diameter of the loop antenna 120 is 37 mm, and the line width of the loop antenna 120 is 1 mm. The loop antenna 120 is an example of a second loop antenna.

A length along the circumferential shape of the loop antenna 120 is set at a length corresponding to the electrical length of one wavelength at the communication frequency (2.4 GHz). The length of the loop antenna 120 is an example of a second length.

A meaning of the length corresponding to the electrical length of one wavelength is similar to that of the loop antenna 110. Because the loop antenna 120 is disposed concentrically inside the loop antenna 110, the length of the loop antenna 120 is shorter than the length of the loop antenna 110. However, both the length of the loop antenna 120 and the length of the loop antenna 110 are lengths corresponding to the electrical length of one wavelength at the communication frequency (2.4 GHz).

The loop antenna 120 is coupled to the loop antenna 110 via the connecting portions 130 and 140. When the loop antenna 110 is fed and a current flows through the loop antenna 120, a current also flows through the loop antenna 120.

The connecting portion 130 couples a connection point 115 of the loop antenna 110 and a connection point 121 of the loop antenna 120 to each other. In addition, the connecting portion 140 couples a connection point 116 of the loop antenna 110 and a connection point 122 of the loop antenna 120 to each other. The connection points 115 and 116 are individually located at positions of lengths corresponding to the electrical length of a quarter wavelength at the communication frequency (2.4 GHz) from the end portions 111 and 112. In addition, the connecting portions 130 and 140 extend along a Y-axis.

The connection points 121 and 122 are separated from each other by half the circumference of the loop antenna 120. The positions in the X-axis direction of the connection points 121 and 122 are substantially equal to those of the connection points 115 and 116. The connection points 121 and 122 are arranged at axisymmetric positions with a straight line passing through a middle point between the end portions 111 and 112 and the center 102 (see FIG. 1) of the loop antenna 110 as an axis of symmetry. The connection points 121 and 122 are an example of a first connection point and a second connection point individually. As an example, the lengths of the connecting portions 130 and 140 are 2 mm. The connecting portion 130 is an example of a first connecting conductor. The connecting portion 140 is an example of a second connecting conductor.

The loop antennas 110 and 120 both have a length corresponding to the electrical length of one wavelength at the communication frequency (2.4 GHz). There is thus a small difference between physical loop lengths of the loop antennas 110 and 120. The loop antennas 110 and 120 are arranged concentrically. Hence, the connecting portions 130 and 140 have a short length, and the loop antennas 110 and 120 are arranged in proximity to each other in a radial direction.

The lengths of the connecting portions 130 and 140 may be set short to such a degree that the direction of the current flowing through the loop antenna 110 and the direction of the current flowing through the loop antenna 120 may be made to coincide with each other. When the lengths of the connecting portions 130 and 140 are too long, it is difficult to make the directions of the currents of the loop antennas 110 and 120 coincide with each other. Making the directions of the currents of the loop antennas 110 and 120 coincide with each other refers to coincidence of the directions and phases of the currents flowing through the loop antennas 110 and 120.

The loop antennas 110 and 120 both have a length corresponding to the electrical length of one wavelength at the communication frequency (2.4 GHz), and the loop antenna 110 is fed at the end portions 111 and 112. In addition, the connection points 115 and 116 are individually located at positions of lengths corresponding to the electrical length of a quarter wavelength at the communication frequency (2.4 GHz) from the end portions 111 and 112.

Therefore, in the loop antenna 110, nodes of a standing wave caused by resonance at 2.4 GHz occur at the connection points 115 and 116, and antinodes of the standing wave occur at the end portions 111 and 112 and a corresponding point 117. The corresponding point 117 is a position of the electrical length of a half wavelength from the end portions 111 and 112, and is a middle point between the connection points 115 and 116. A maximum voltage and a minimum current occur at the nodes of the standing wave, and a maximum current and a minimum voltage occur at the antinodes of the standing wave.

For example, the loop antenna 120 is coupled to the loop antenna 110 by the connecting portions 130 and 140 at the positions at which the nodes occur. Therefore, a standing wave caused by resonance at 2.4 GHz occurs also in the loop antenna 120, nodes of the standing wave occur at the connection points 121 and 122 coupled to the connecting portions 130 and 140, and antinodes of the standing wave occur at corresponding points 123 and 124. The corresponding points 123 and 124 are middle points between the connection points 121 and 122, and are points located at positions individually corresponding to the feeding point (the end portions 111 and 112) and the corresponding point 117 of the loop antenna 110.

The matching circuit 150 is a chip of a capacitor and/or an inductor. The matching circuit 150 is provided to adjust the impedance of the loop antenna 110. Here, as an example, a mode is applied in which a capacitor chip of 0.1 pF is inserted in series between the end portions 113 and 114. However, an inductor chip may be used, or both an inductor chip and a capacitor chip may be used. These chips for impedance matching may be provided so as to be stretched between the end portions 111 and 112 in place of or in addition to being inserted in series between the end portions 113 and 114.

Figure 3:
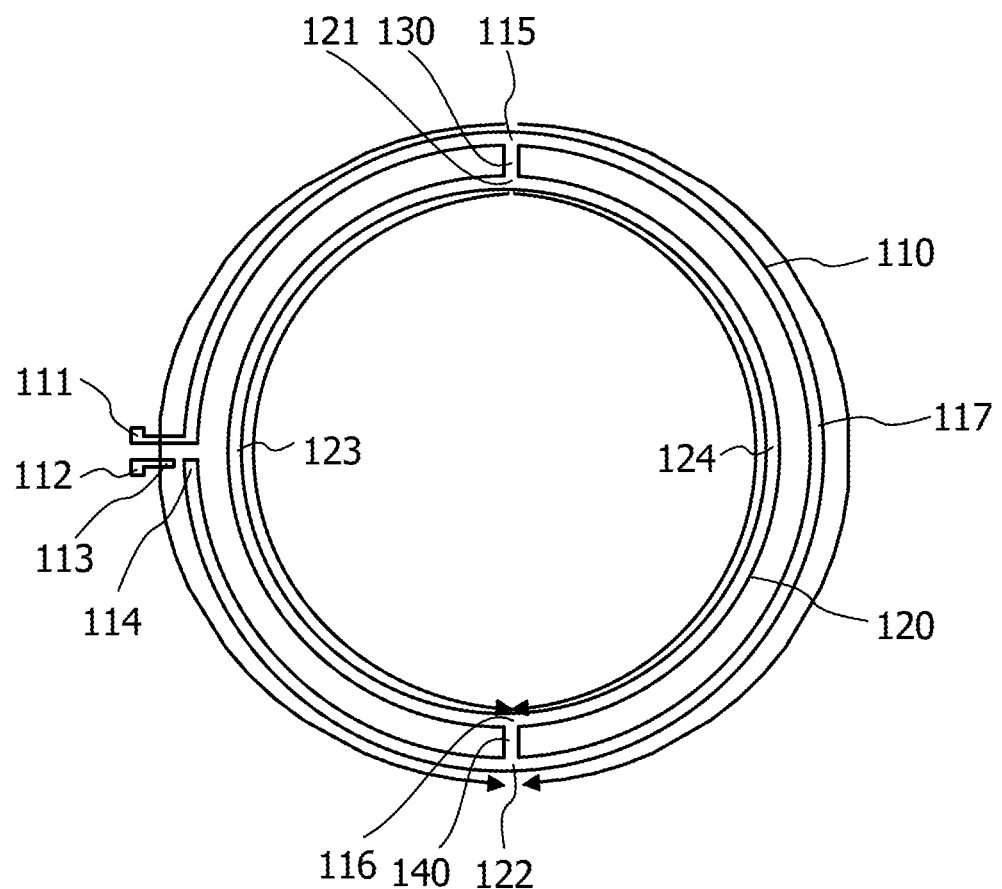
FIG. 3 illustrates an example of directions of currents occurring in an antenna device.

FIG. 3 illustrates an example of directions of currents occurring in an antenna device. In FIG. 3, the board 101 is omitted, and the directions of the currents are indicated by arrows. A current flows from the connection point 115 to the connection point 116 in the loop antenna 110, and at this time, a current flows from the connection point 121 to the connection point 122 in the loop antenna 120.

As an example, supposing that the directions of the currents illustrated in FIG. 3 are directions in timing of a maximum amplitude of the antinodes of the standing wave of the current occurring at the end portions 111 and 112 (feeding point) and the corresponding point 117, the directions of the currents are reversed in timing of a phase different by 180 degrees.

Thus, as viewed from the connecting portions 130 and 140, the currents flow through the loop antennas 110 and 120 in the same direction. The same direction refers to a fact that the following directions are the same: a direction in which the current flows from the connection point 115 through the end portions 111 and 112 to the connection point 116 in the loop antenna 110; and a direction in which the current flows from the connection point 121 through the corresponding point 123 to the connection point 122 in the loop antenna 120. In addition, the same direction refers to a fact that the following directions are the same: a direction in which the current flows from the connection point 115 through the corresponding point 117 to the connection point 116 in the loop antenna 110; and a direction in which the current flows from the connection point 121 through the corresponding point 124 to the connection point 122 in the loop antenna 120.

It is therefore considered that in the antenna device 100, electromagnetic waves radiated by the currents flowing through the loop antennas 110 and 120 are synthesized to increase radiation, thus providing excellent radiation characteristics and exhibiting excellent communication characteristics. When the directions of the currents were confirmed by simulation, the same result as in FIG. 3 was obtained.

Figure 4:
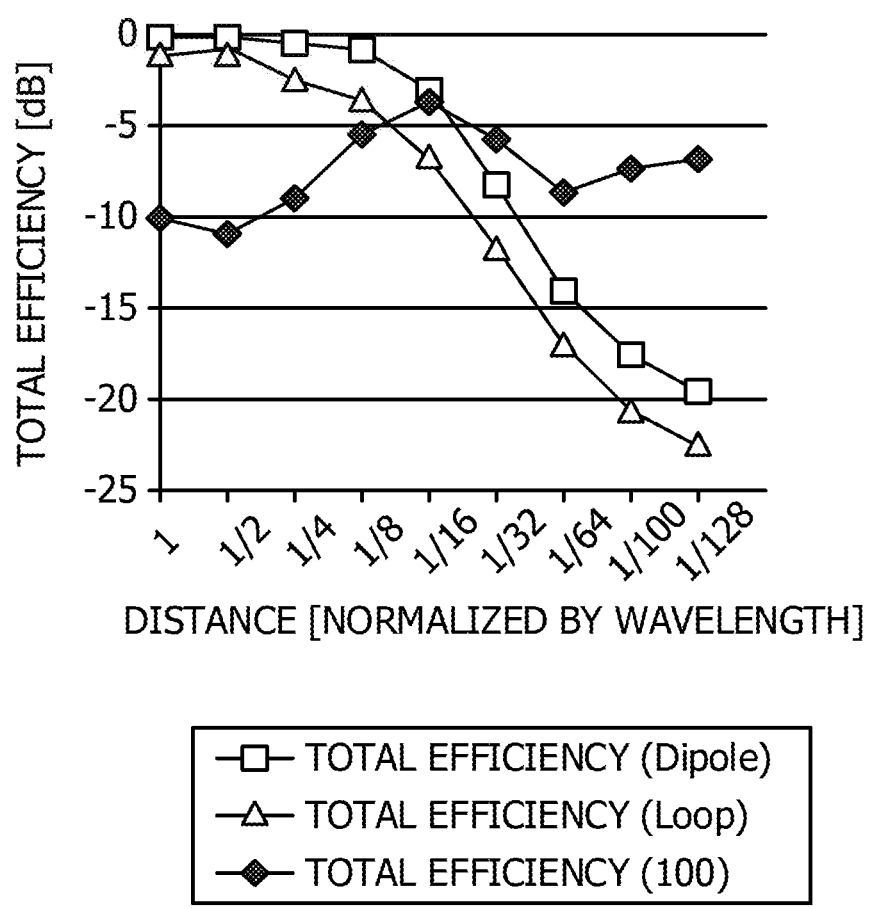
FIG. 4 illustrates an example of a result of simulation of an antenna device.
Figure 5:
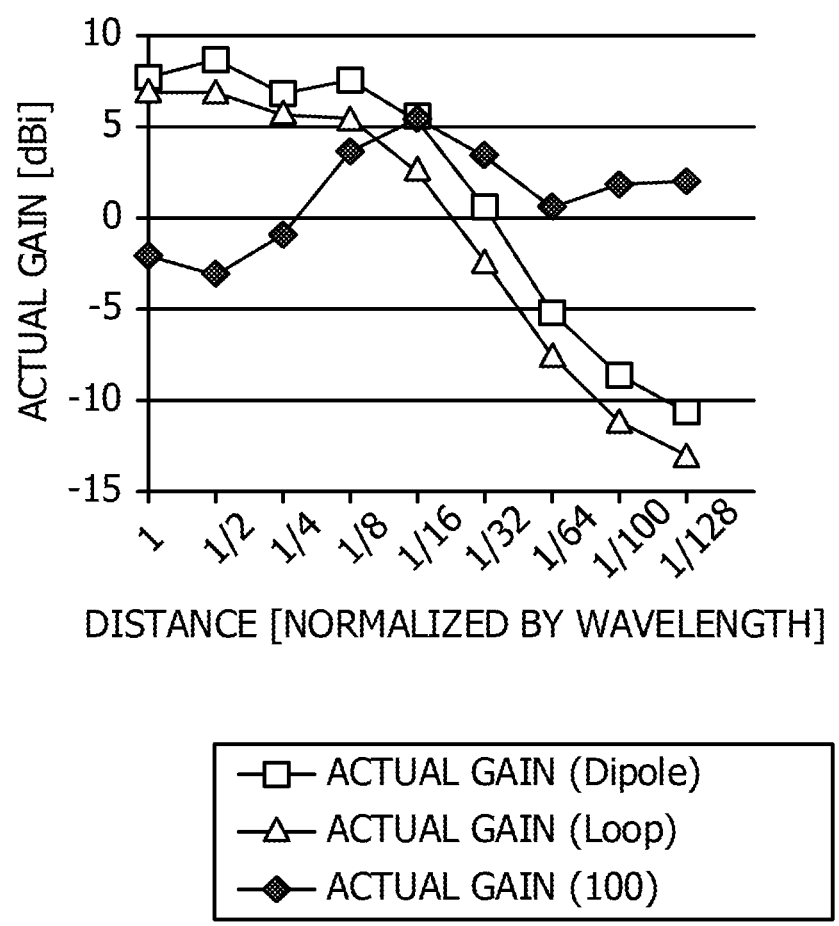
FIG. 5 illustrates an example of a result of simulation of an antenna device.

FIG. 4 and FIG. 5 illustrate an example of results of simulation of an antenna device. FIG. 4 illustrates characteristics of total efficiency (dB) with respect to a distance between the antenna device 100 and a metallic conductor. FIG. 5 illustrates characteristics of actual gain (dBi) with respect to the distance between the antenna device 100 and the metallic conductor. The actual gain in this case refers to a maximum actual gain of a three-dimensional radiation pattern. The distance (wavelength standard) on an axis of abscissas is represented as a value normalized by the electrical length of one wavelength at 2.4 GHz (obtained by dividing the distance by the electrical length).

FIG. 4 and FIG. 5 illustrate results of simulation of total efficiency characteristics of a dipole antenna (Dipole) and a loop antenna (Loop) having a communication frequency of 2.4 GHz with respect to the distance to the metallic conductor. The characteristics of the antenna device 100 are indicated by rhombic data points. The characteristics of the dipole antenna and the loop antenna are indicated by quadrangular and triangular data points, respectively.

As illustrated in FIG. 4, the total efficiencies of the dipole antenna and the loop antenna are equal to or more than −10 (dB) and thus exhibit excellent values when the distance is in a range of 1 to approximately $1/32$. However, when the distance becomes shorter than $1/32$, the total efficiencies of the dipole antenna and the loop antenna become less than −10 (dB), so that excellent communication characteristics tend not to be obtained.

On the other hand, the total efficiency of the antenna device 100 is equal to or more than −10 (dB) and thus exhibits an excellent value over substantially the entire distance range of 1 to $1/128$. When the distance is $1/2$, the total efficiency of the antenna device 100 is less than −10 (dB), but is approximately −11 (dB), so that a value presenting no problem is obtained.

As for the actual gains illustrated in FIG. 5, the actual gains of the dipole antenna and the loop antenna are equal to or more than −5 (dBi) and thus exhibit excellent values when the distance is in a range of 1 to approximately $1/64$. However, when the distance becomes shorter than $1/64$, the actual gains of the dipole antenna and the loop antenna become less than −5 (dBi), so that excellent communication characteristics tend not to be obtained.

On the other hand, the actual gain of the antenna device 100 is equal to or more than −5 (dBi) and thus exhibits excellent values over the entire distance range of 1 to ¹⁄₁₂₈, so that excellent communication characteristics are obtained.

Figure 6:
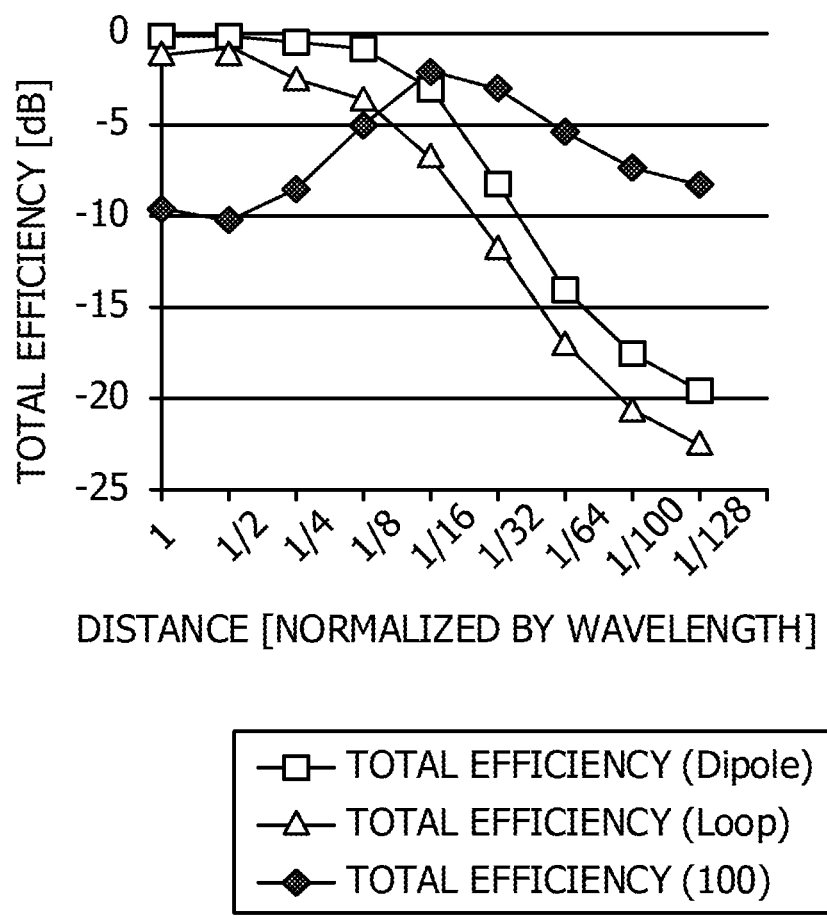
FIG. 6 illustrates an example of a result of simulation of total efficiency of an antenna device.

FIG. 6 illustrates a result of simulation of the total efficiency in a case where the board 101 is removed from the antenna device 100. FIG. 6 illustrates the characteristics of the total efficiency (dB) with respect to the distance to the metallic conductor in a case where the matching circuit 150 of the antenna device 100 includes a 0.2-pF capacitor chip inserted in series with the loop antenna 110 between the end portions 113 and 114 and a 0.3-pF capacitor chip inserted in parallel with the loop antenna 110 between the end portion 111 and 112. As in FIG. 4 and FIG. 5, the distance on an axis of abscissas is normalized by the electrical length of one wavelength at 2.4 GHz (obtained by dividing the distance by the electrical length).

FIG. 6 illustrates results of simulation of the total efficiency characteristics of the dipole antenna (Dipole) and the loop antenna (Loop) having a communication frequency of 2.4 GHz with respect to the distance to the metallic conductor. The characteristics of the antenna device 100 are indicated by rhombic data points, and the characteristics of the dipole antenna and the loop antenna are indicated by quadrangular and triangular data points, respectively. The characteristics of the dipole antenna and the loop antenna are similar to those in FIG. 4.

The total efficiencies of the dipole antenna and the loop antenna are not excellent when the distance is shorter than ¹⁄₃₂, whereas the total efficiency of the antenna device 100 is equal to or more than −10 (dB) and thus exhibits excellent values over the entire distance range of 1 to ¹⁄₁₂₈.

Figure 7:
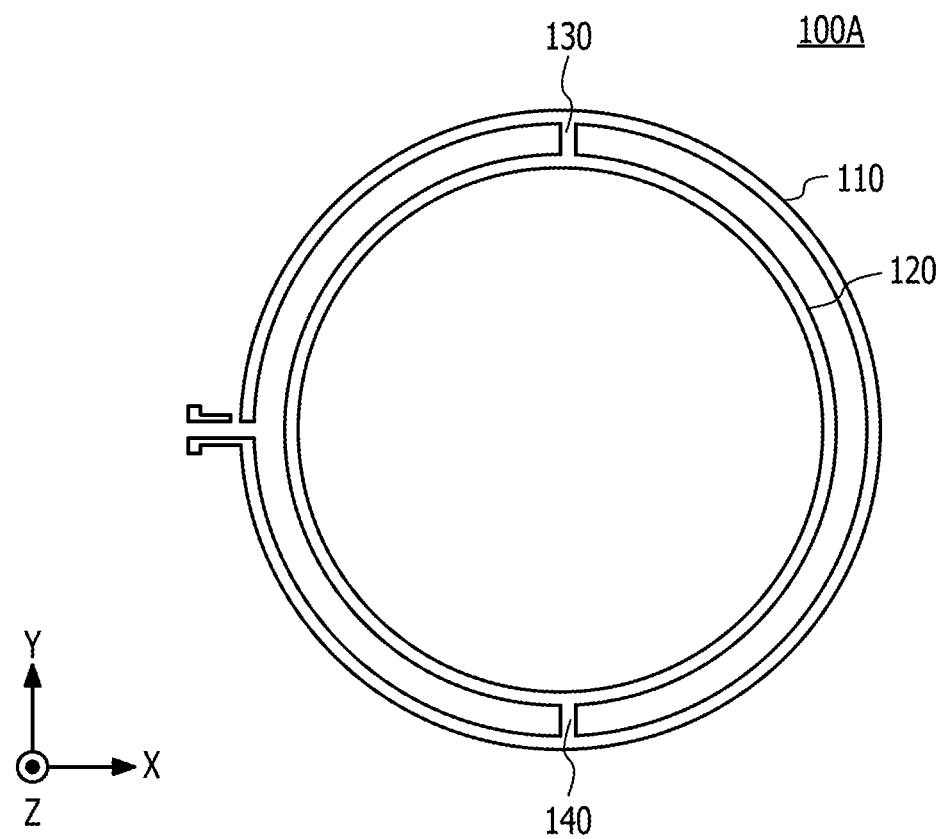
FIG. 7 illustrates an example of an antenna device.
Figure 8:
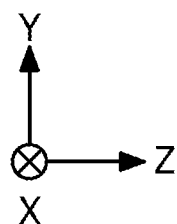
FIG. 8 illustrates an example of an antenna device.
Figure 9:
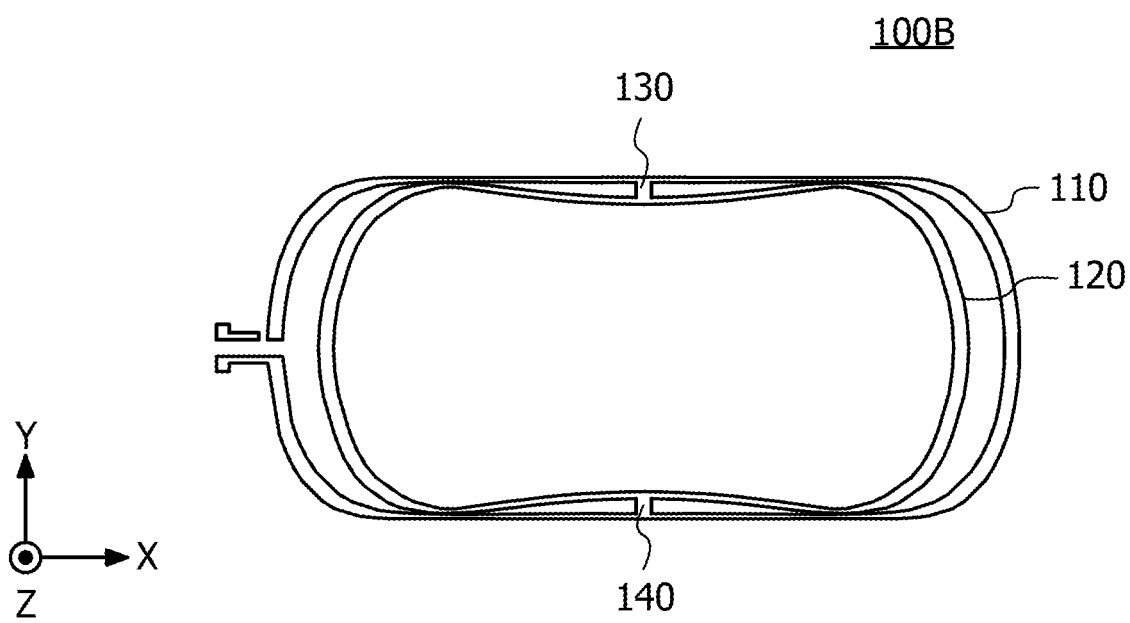
FIG. 9 illustrates an example of an antenna device.
Figure 10:
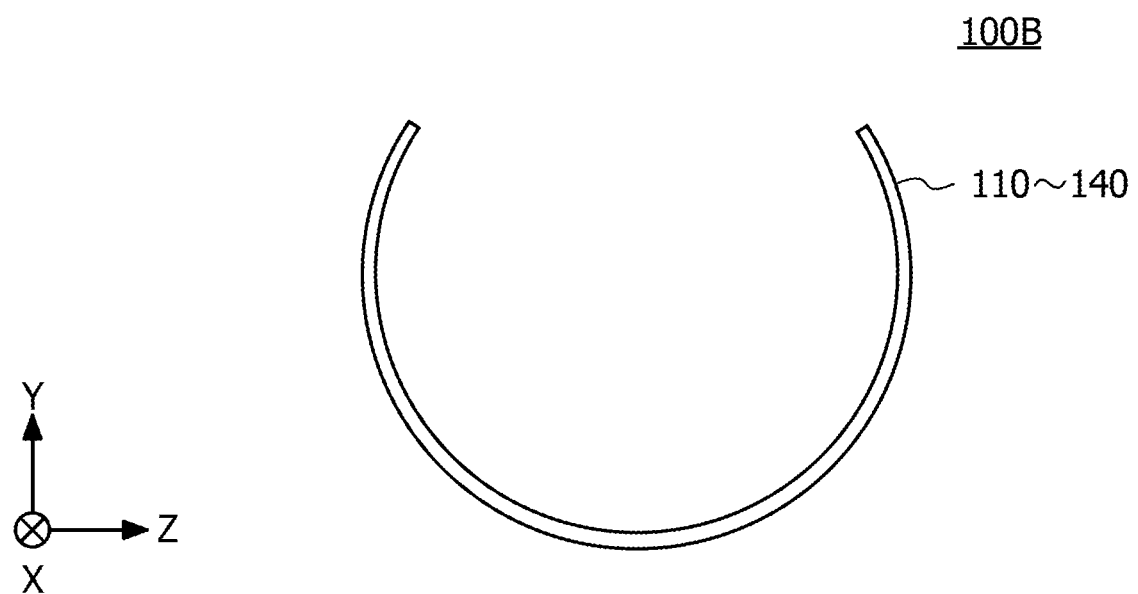
FIG. 10 illustrates an example of an antenna device.

FIGS. 7 to 10 illustrate an example of antenna devices. Antenna devices 100A and 100B have a configuration formed by removing the board 101 and the matching circuit 150 from the antenna device 100 and establishing connection between the end portions 113 and 114 by a 0-Ω resistance. A difference between the antenna devices 100A and 100B lies in whether or not the antenna devices are bent. FIG. 7 and FIG. 9 individually illustrate the antenna devices 100A and 100B as viewed in an XY plane. FIG. 8 and FIG. 10 individually illustrate the antenna devices 100A and 100B as viewed in a YZ plane.

As illustrated in FIG. 7 and FIG. 8, the antenna device 100A is a sheet-shaped antenna device parallel with the XY plane. In addition, as illustrated in FIG. 9 and FIG. 10, the antenna device 100B is a sheet-shaped antenna device bent about the X-axis. In a case where the loop antennas 110 and 120 and the connecting portions 130 and 140 are arranged on a flexible board or arranged on an outer circumferential surface of a cylindrical member, for example, the loop antennas 110 and 120 and the connecting portions 130 and 140 may be bent as in the case of the antenna device 100B.

Figure 11:
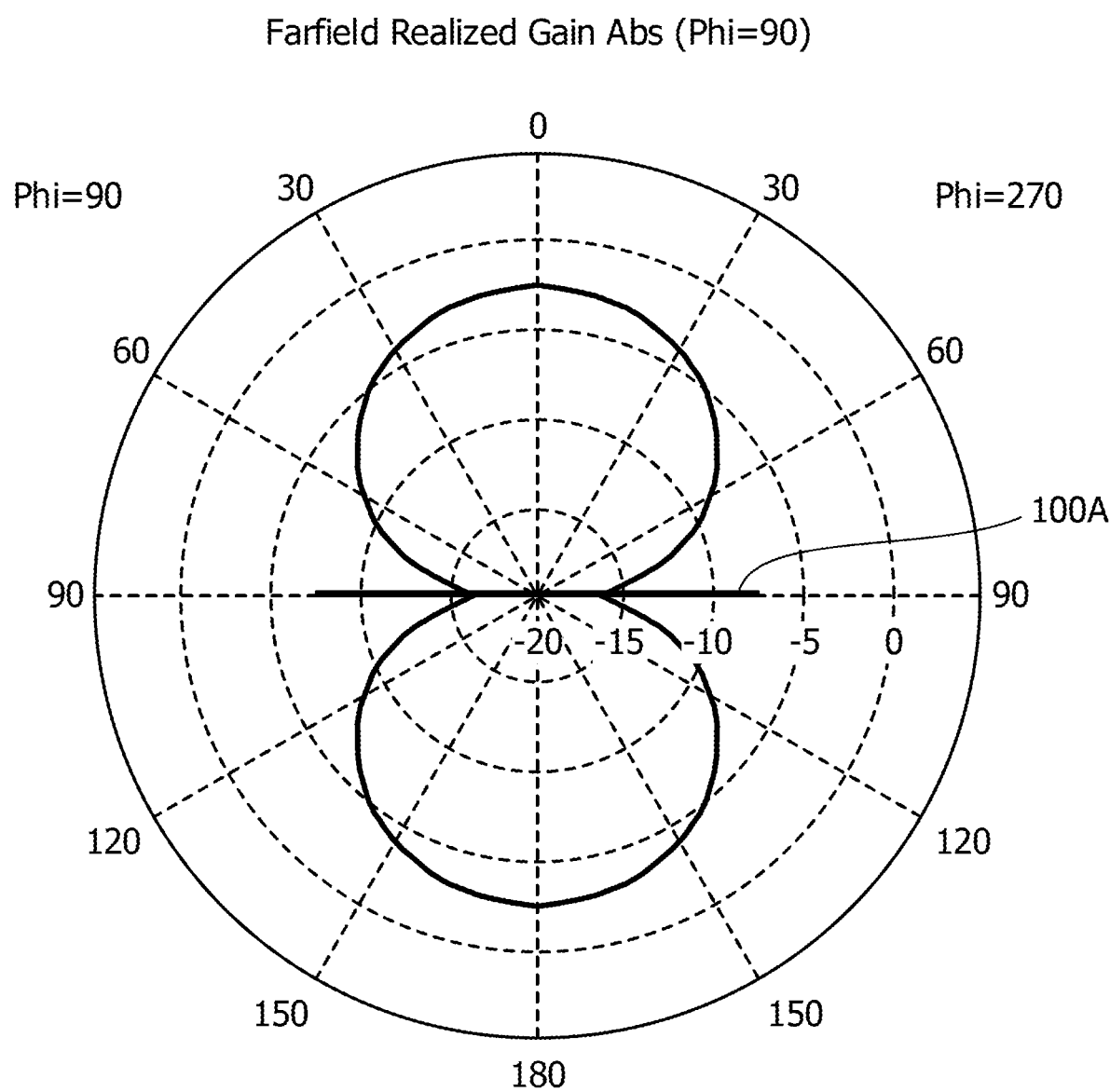
FIG. 11 illustrates an example of actual gain of an antenna device.
Figure 12:
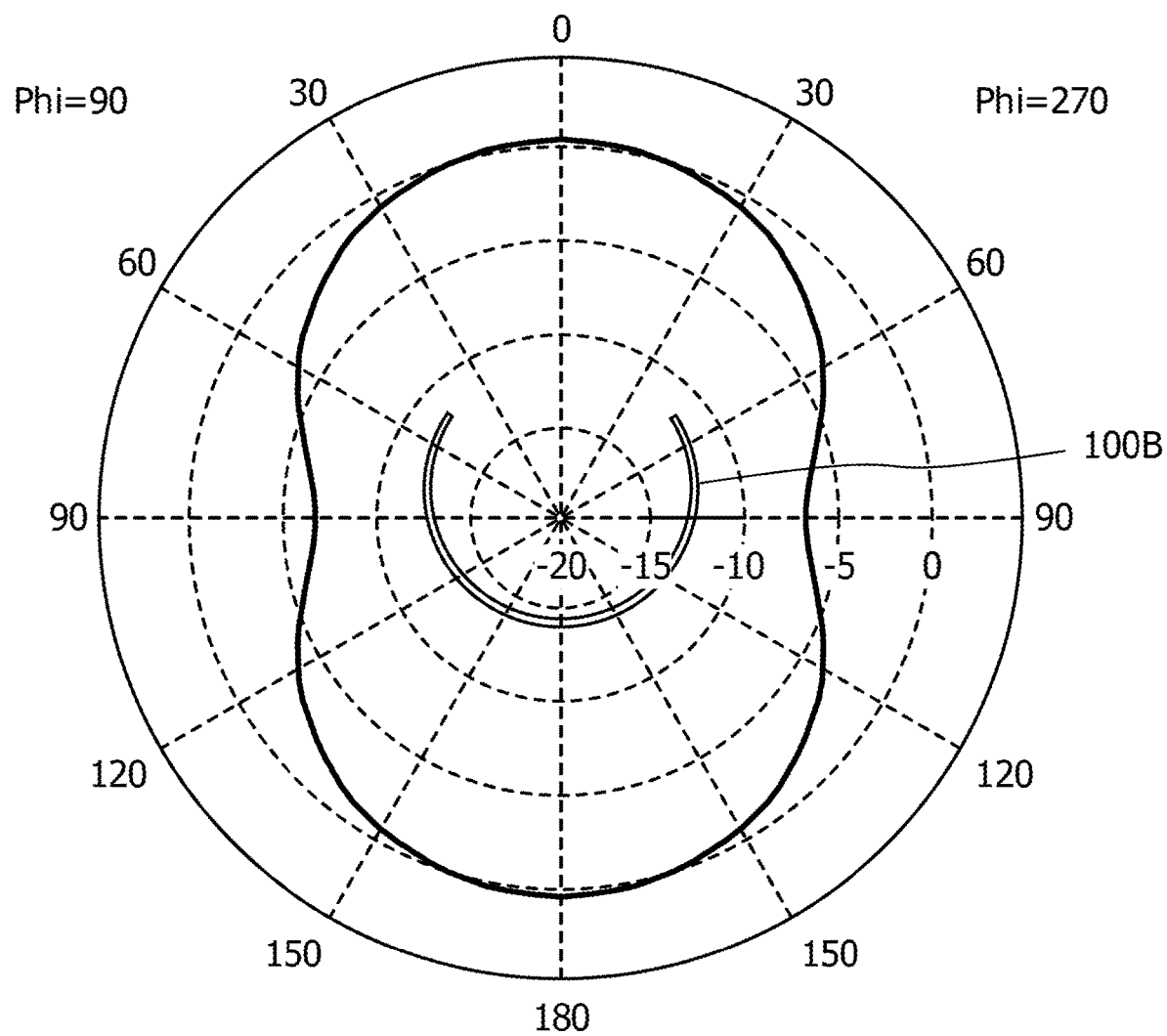
FIG. 12 illustrates an example of actual gain of an antenna device.

FIG. 11 and FIG. 12 illustrate an example of directivities of antenna devices. FIG. 11 and FIG. 12 illustrate the directivities in a state in which the antenna devices 100A and 100B are viewed in the YZ plane from an X-axis negative direction side as illustrated in FIG. 8 and FIG. 10. The directivities may be expressed by actual gain. The antenna devices 100A and 100B do not include the matching circuit 150 (see FIG. 1). Therefore, connection between the end portions 113 and 114 illustrated in FIG. 1 is established by a 0-Ω resistance.

As illustrated in FIG. 11, the actual gain of the antenna device 100A decreases at points as in a case of a null point in a 90-degree direction. However, the directivity of the antenna device 100A is symmetric on a 0-degree side and a 180-degree side, and exhibits an excellent value of approximately −2.5 dBi in a 0-degree direction and a 180-degree direction.

As illustrated in FIG. 12, as for the directivity of the antenna device 100B, the actual gain in the 90-degree direction is improved as compared with the antenna device 100A, and the directivity is symmetric on the 0-degree side and the 180-degree side, and exhibits an excellent value of approximately 0 dBi in the 0-degree direction and the 180-degree direction.

Figure 13:
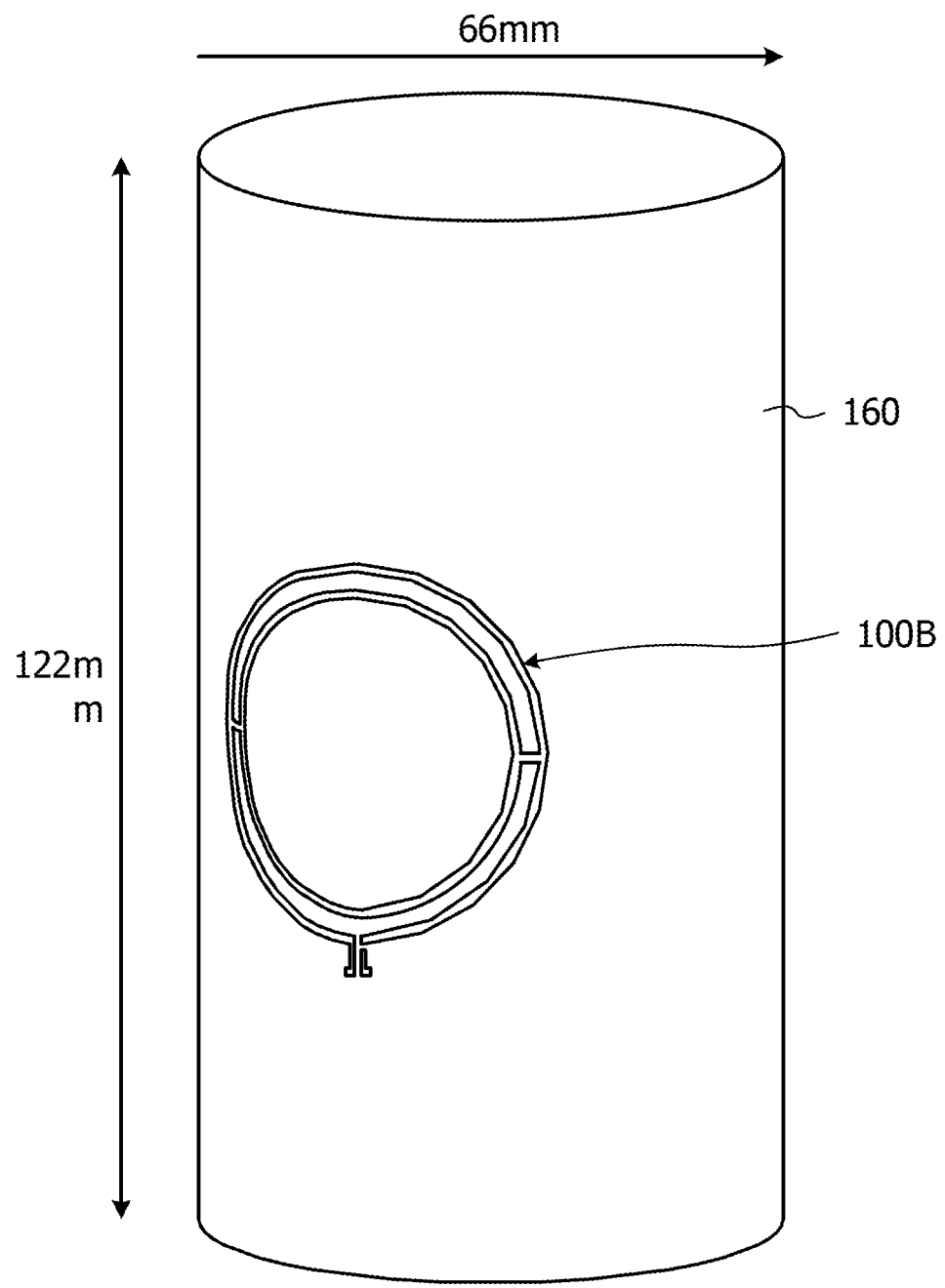
FIG. 13 illustrates an example of an antenna device.
Figure 14:
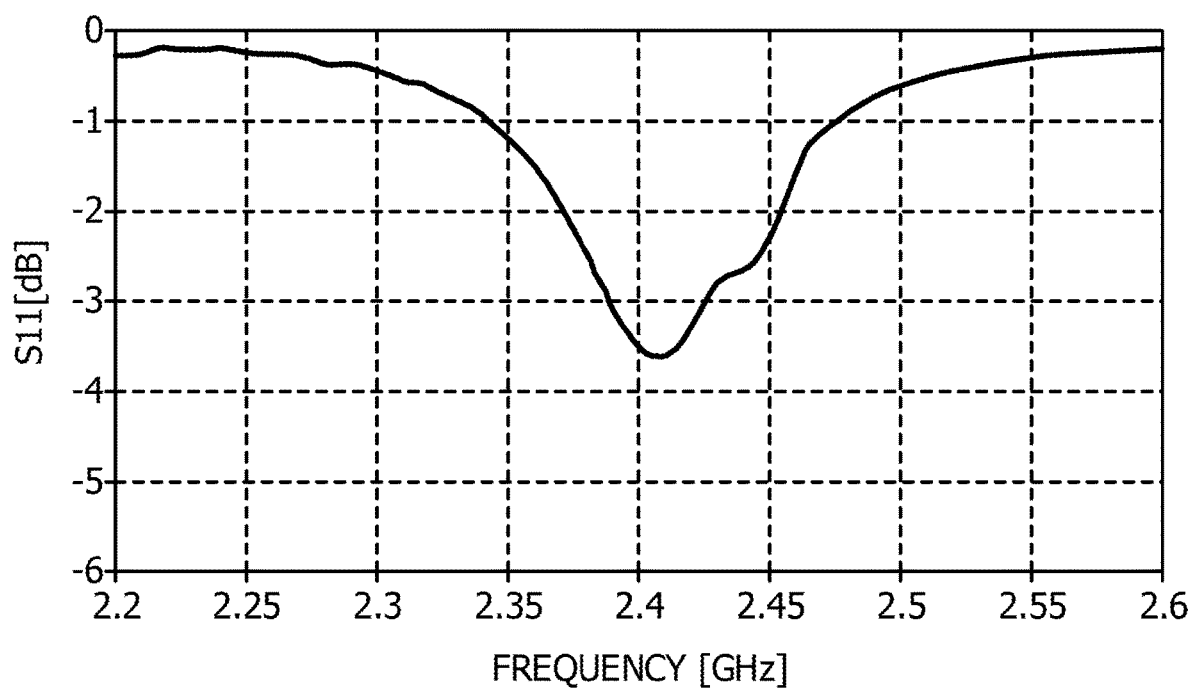
FIG. 14 illustrates an example of a result of simulation of frequency characteristics of an S11 parameter of an antenna device.
Figure 15:
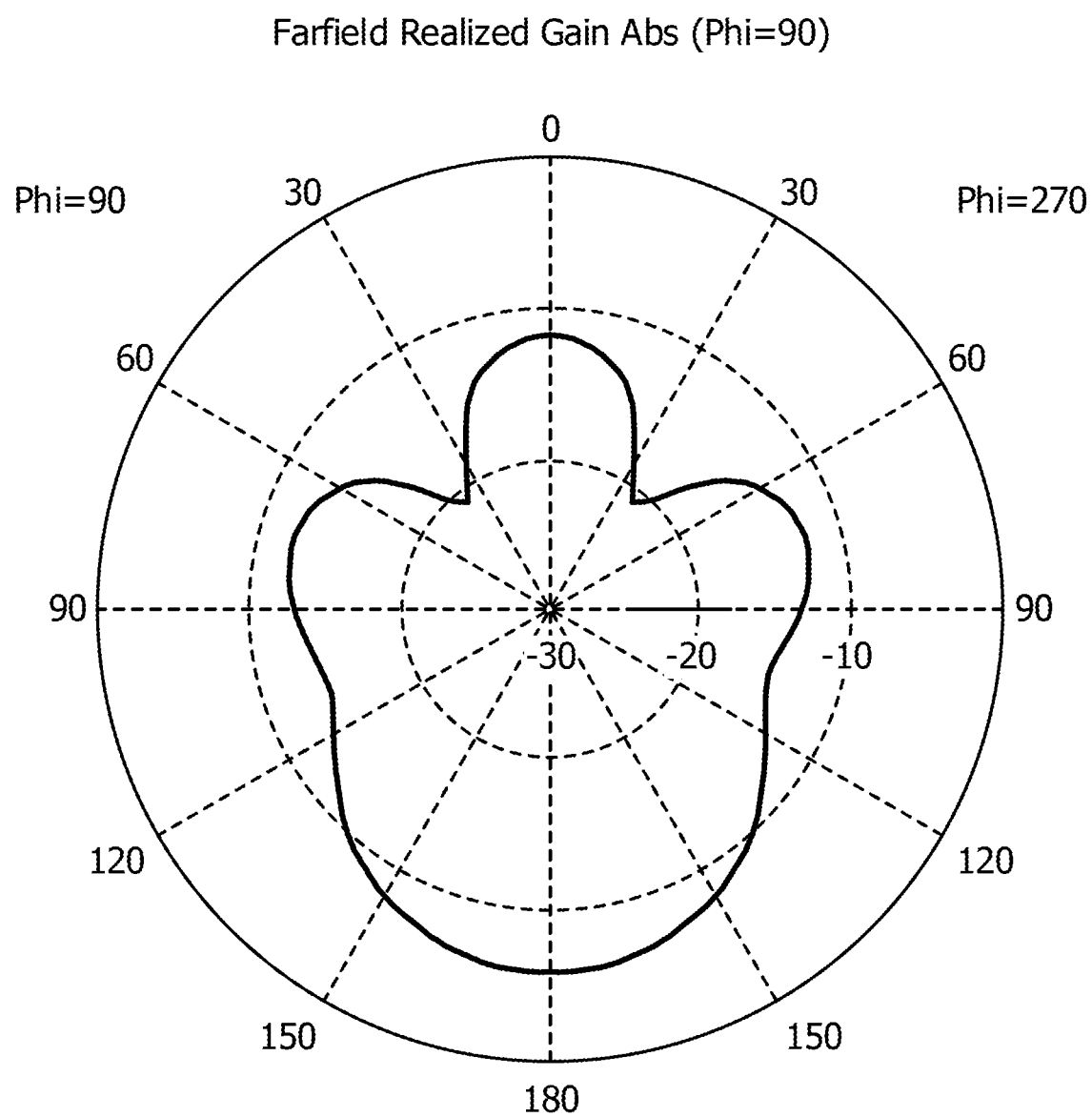
FIG. 15 illustrates an example of actual gain of an antenna device.

FIG. 13 illustrates an example of an antenna device. In FIG. 13, the antenna device 100B is affixed to an outer peripheral portion of a cylindrical member 160 made of a metal. The member corresponds to a metallic can for 350 ml. The member has a diameter of 66 mm and a height of 122 mm. [0052] FIG. 14 is a diagram illustrating a result of simulation of frequency characteristics of an S11 parameter of the antenna device 100B illustrated in FIG. 13. FIG. 15 is a diagram illustrating the actual gain (dBi) of the antenna device 100B illustrated in FIG. 13, and illustrates directivity in a state in which the antenna device is viewed in the YZ plane from the X-axis negative direction side, as illustrated in FIG. 10.

As illustrated in FIG. 14, approximately −3.5 dB is achieved at the communication frequency (2.4 GHz), and it may be confirmed that excellent radiation characteristics are obtained with little reflection. In FIG. 15, the actual gain in the 0-degree direction is low because the antenna device 100B is positioned as in FIG. 12. However, an actual gain of −5.9 dBi is obtained in the 180-degree direction in which the center of the antenna device 100B faces the outside of the metallic can. It is thus understood that an actual gain at a sufficiently usable level is obtained when a communication distance is not very long as in a case where the antenna device 100B is used indoors, for example.

Figure 16:
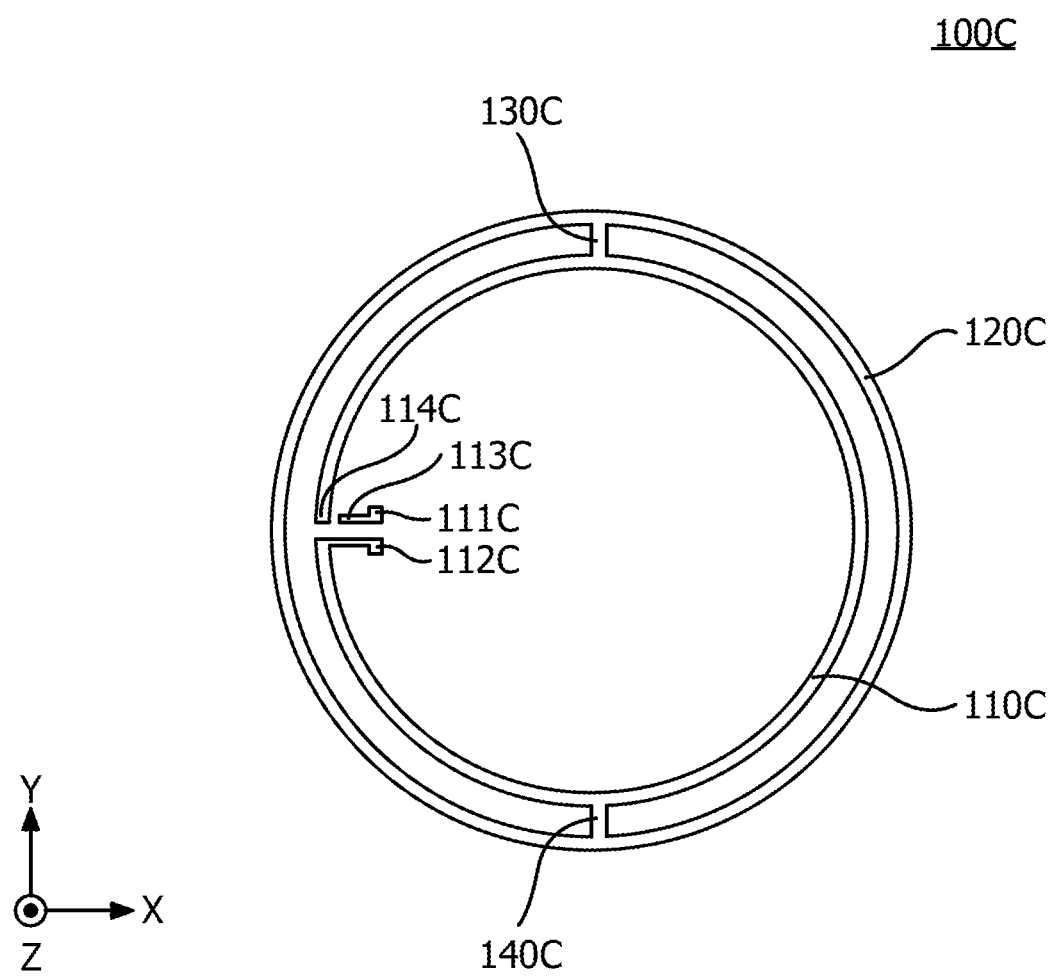
FIG. 16 illustrates an example of an antenna device.

FIG. 16 illustrates an example of an antenna device. An antenna device 100C includes loop antennas 110C and 120C and connecting portions 130C and 140C. In the antenna device 100C, the loop antenna 110C is located inside the loop antenna 120C as viewed in plan, and end portions 111C and 112C serving as a feeding point are located inside of the loop antenna 110C and face in the direction of a center.

Thus, as compared with the antenna devices 100 and 100A illustrated in FIG. 1 and FIG. 7, the antenna device 100C has a configuration formed by interchanging the positions of the loop antennas 110 and 120 and drawing the end portions 111 and 112 inward in a radial direction. Therefore, similar constituent elements are given a suffix C. In FIG. 16, the matching circuit 150 is omitted. However, the matching circuit 150 is connectable between end portion 113C and 114C, and the matching circuit 150 may be coupled between the end portions 111C and 112C.

Figure 17:
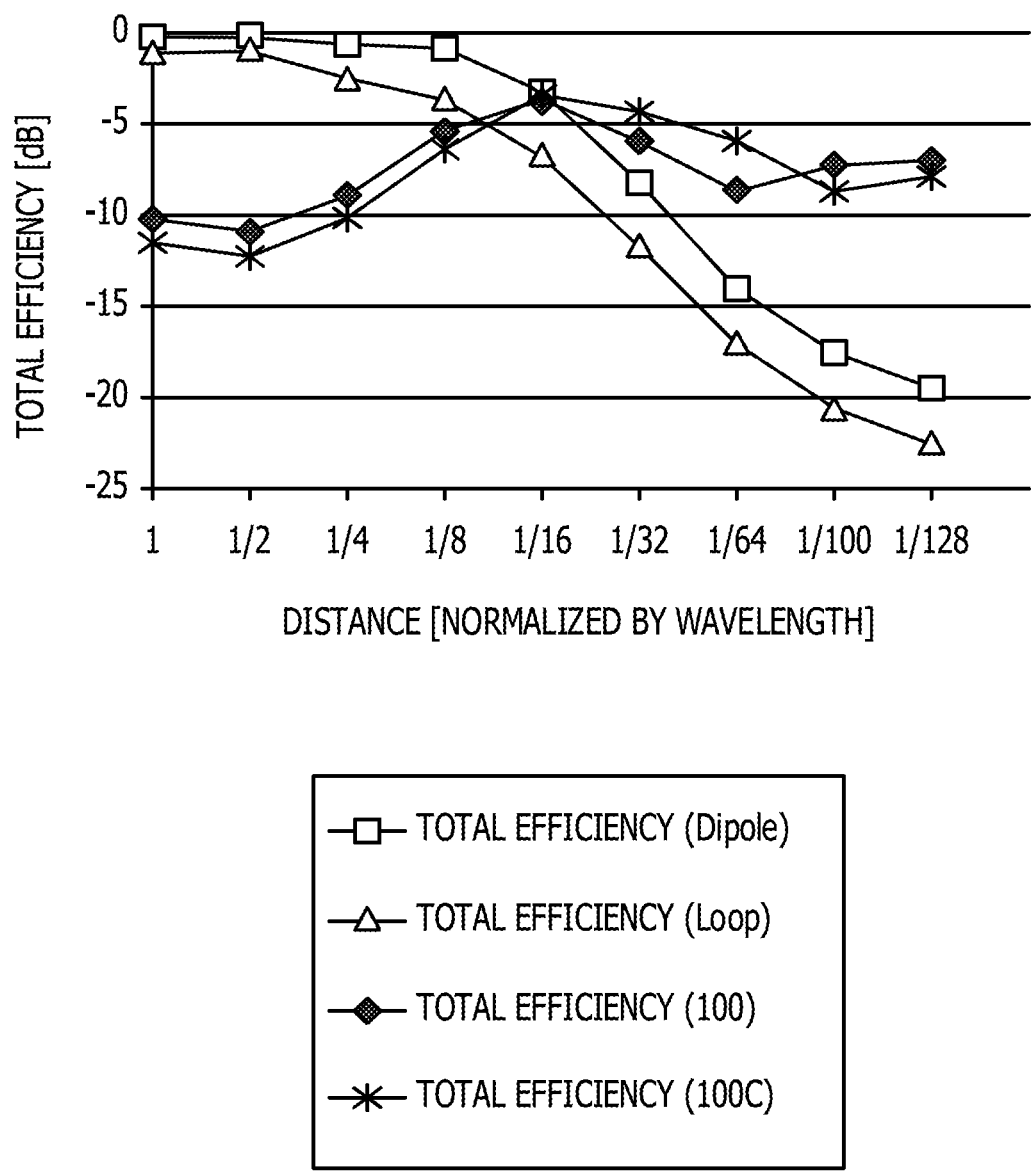
FIG. 17 illustrates an example of a result of simulation of total efficiency of an antenna device.
Figure 18:
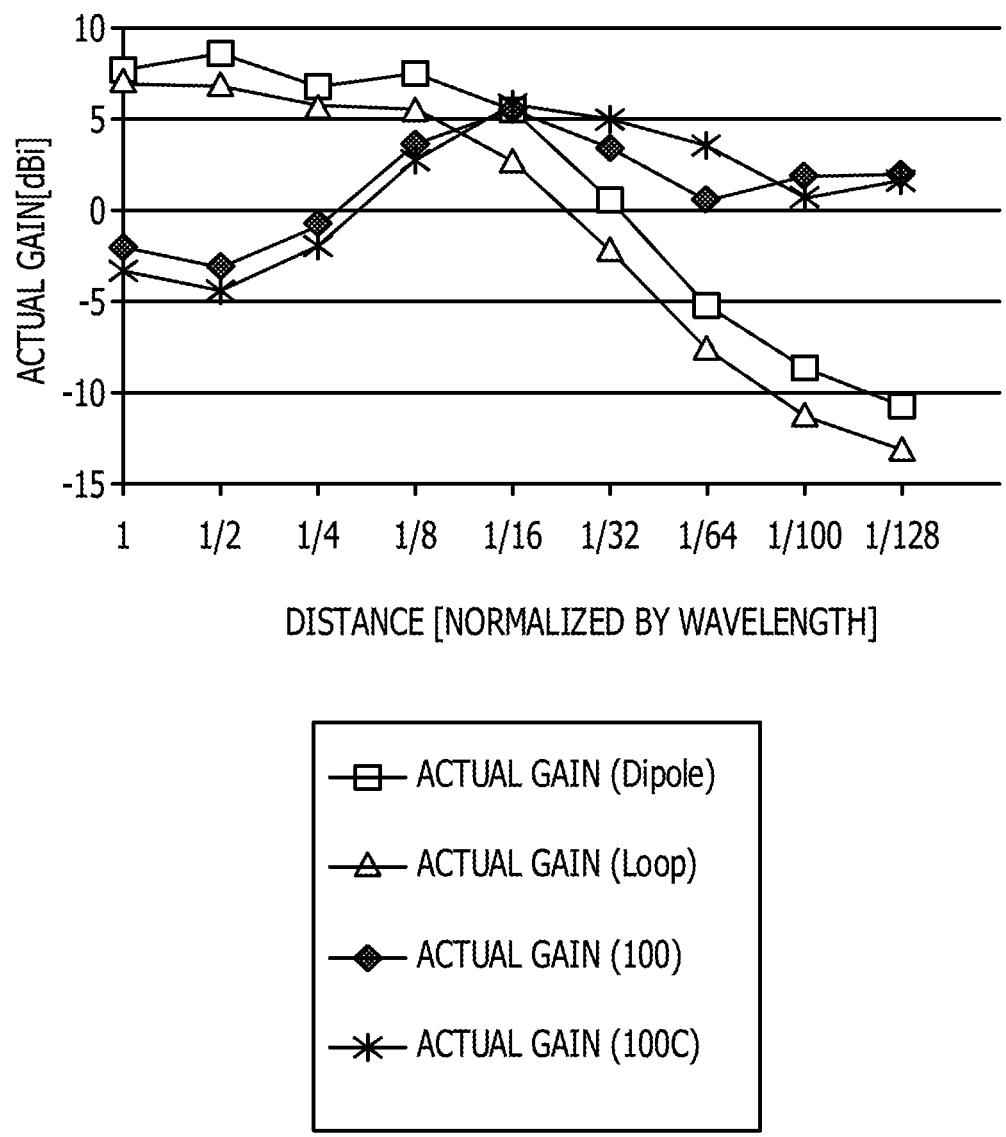
FIG. 18 illustrates an example of a result of simulation of actual gain of an antenna device.

FIG. 17 illustrates an example of a result of simulation of total efficiency of an antenna device. FIG. 18 illustrates an example of a result of simulation of actual gain of an antenna device. Axes of abscissas and axes of ordinates in FIG. 17 and FIG. 18 are similar to those of FIG. 4 and FIG. 5 individually. FIG. 17 and FIG. 18 illustrate, for comparison, results of simulation of characteristics of the total efficiencies of the dipole antenna (Dipole), the loop antenna (Loop), and the antenna device 100 (see FIG. 1 and FIG. 7) having a communication frequency of 2.4 GHz with respect to a distance to a metallic conductor.

The characteristics of the antenna device 100C are indicated by data points of *, the characteristics of the antenna device 100 are indicated by rhombic data points, and the characteristics of the dipole antenna and the loop antenna are indicated by quadrangular and triangular data points, respectively. The characteristics of the dipole antenna, the loop antenna, and the antenna device 100 for comparison are similar to those in FIG. 4.

As illustrated in FIG. 17, the total efficiency of the antenna device 100C is substantially similar to the total efficiency of the antenna device 100, and exhibits an excellent value equal to or more than −10 (dB) over substantially an entire distance range of 1 to 1/128.

As illustrated in FIG. 18, the actual gain of the antenna device 100C is substantially similar to the actual gain of the antenna device 100, and exhibits excellent values equal to or more than −5 (dBi) over the entire distance range of 1 to 1/128.

It is therefore understood that the antenna device 100C having, as a feeding point, the end portions 111C and 112C of the loop antenna 110C on the inside may be treated in a similar manner to the antenna device 100 (see FIG. 1 and FIG. 7) having, as a feeding point, the end portions 111 and 112 of the loop antenna 110 on the outside.

Figure 19:
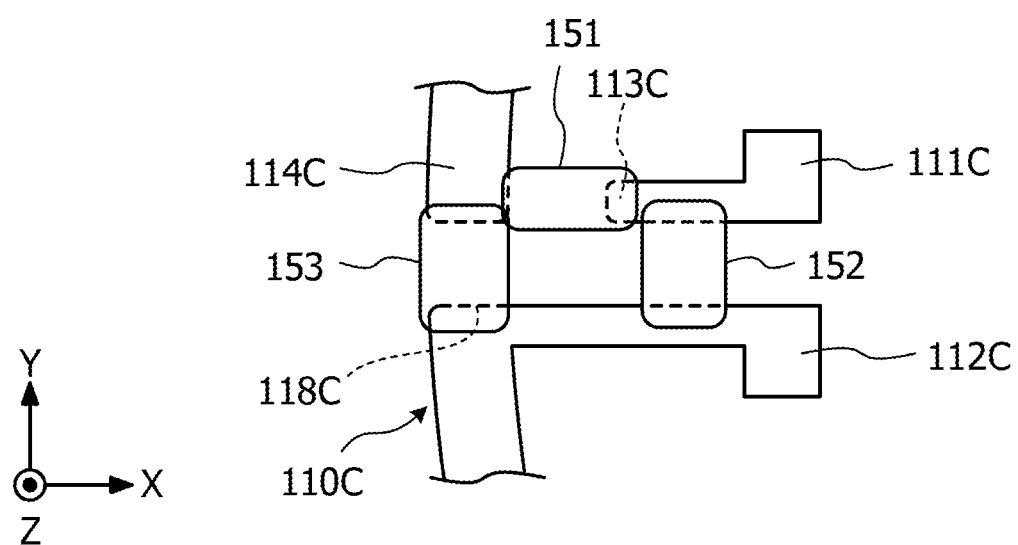
FIG. 19 is an enlarged view of end portions of an antenna device.

FIG. 19 is an enlarged view of the end portions 111C and 112C and the end portions 113C and 114C of the antenna device 100C. A part bent in the X-axis direction toward the end portion 112C from a circumferential part of the loop antenna 110C will be referred to as a bent portion 118C.

Matching circuits 151, 152, and 153 may be attached to the loop antenna 110C to adjust the impedance of the loop antenna 110C. The matching circuit 151 may be inserted in series into the loop antenna 110 by coupling the matching circuit 151 between the end portion 113C and 114C. The matching circuit 152 may be inserted in parallel into the loop antenna 110 by coupling the matching circuit 152 between the end portions 111C and 112C. The matching circuit 153 is inserted in parallel into the loop antenna 110 by coupling the matching circuit 153 between the end portion 114C and the bent portion 118C.

Figure 20:
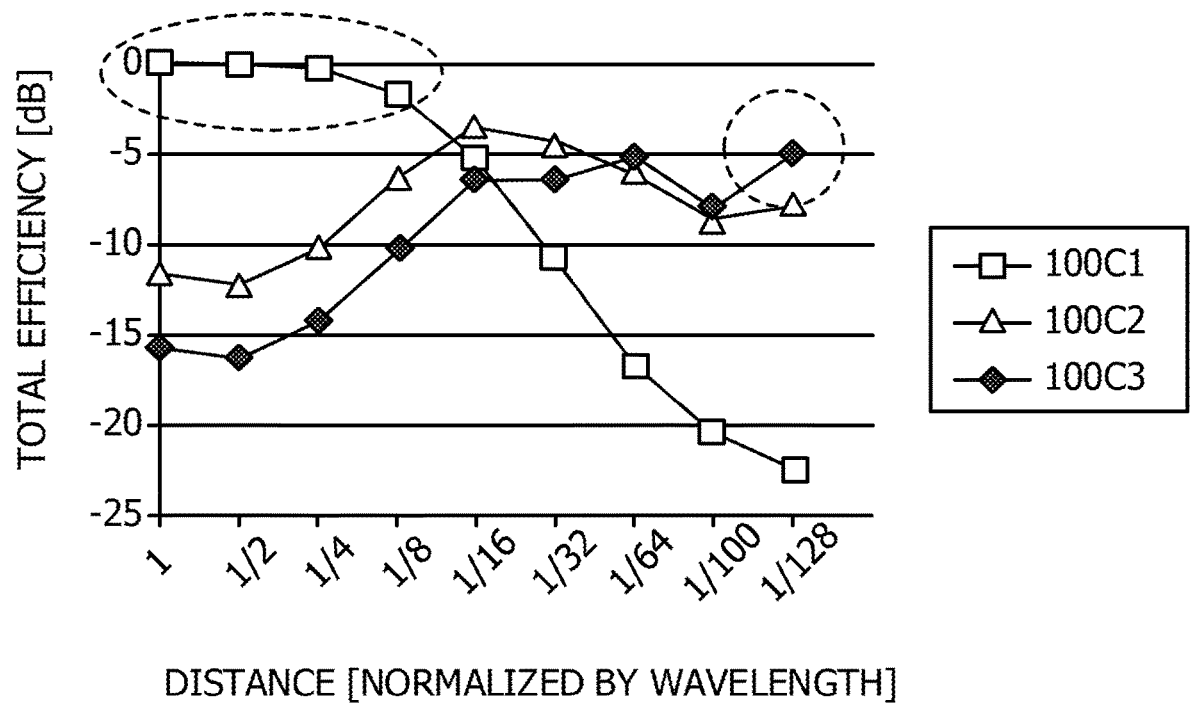
FIG. 20 illustrates an example of a result of simulation of total efficiency of an antenna device.
Figure 21:
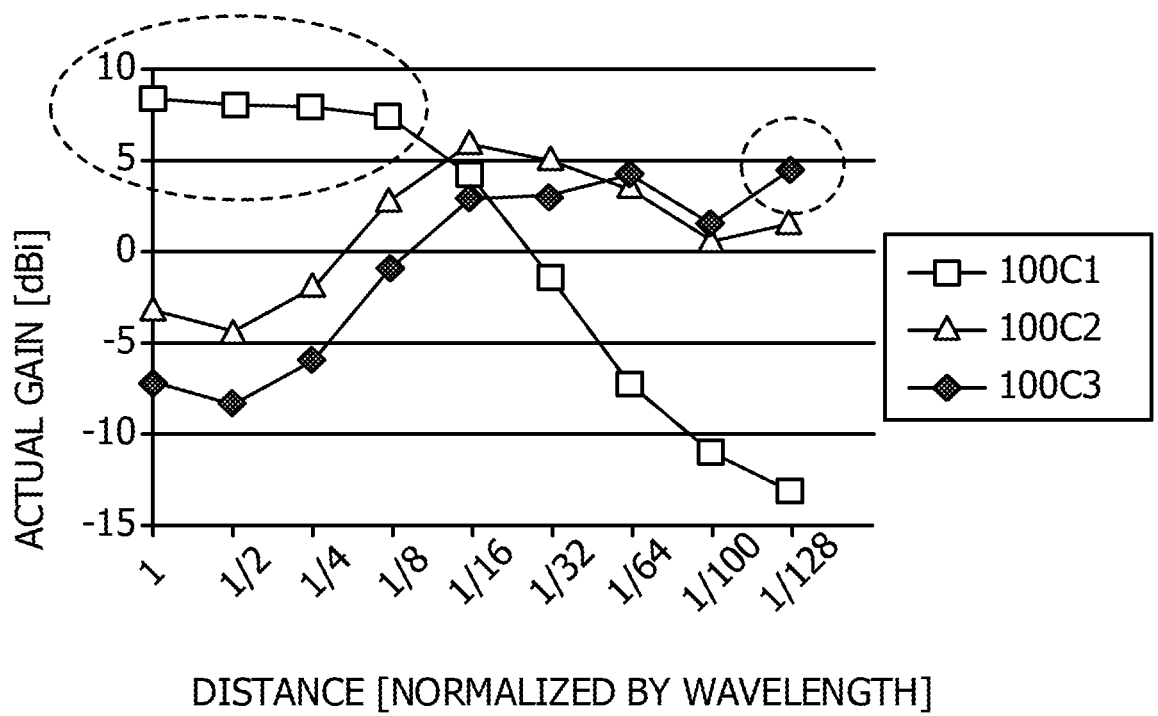
FIG. 21 illustrates an example of a result of simulation of actual gain of an antenna device.

FIG. 20 illustrates an example of a result of simulation of total efficiency of an antenna device. FIG. 21 illustrates an example of a result of simulation of actual gain of an antenna device. Axes of abscissas and axes of ordinates in FIG. 20 and FIG. 21 are similar to those in FIG. 4 and FIG. 5 individually.

The antenna device 100C (referred to as 100C1), for example, has excellent communication characteristics in an air distant from a metallic conductor. The antenna device 100C (referred to as 100C2), for example, has excellent communication characteristics both in the vicinity of the metallic conductor and in an air distant from the metallic conductor. The antenna device 100C (referred to as 100C3), for example, has excellent communication characteristics in the vicinity of the metallic conductor.

Such antenna devices 100C1, 100C2, and 100C3 are realized by setting the matching circuits 151, 152, and 153 in various forms. The antenna device 100C1 uses a 0.3-pF capacitor chip as the matching circuit 151, and uses a 9.4-nH inductor chip as the matching circuit 153.

The antenna device 100C2 uses a 2.5-pF capacitor chip as the matching circuit 151, and uses a 1.4-pF capacitor chip as the matching circuit 153. The antenna device 100C3 uses a 3.1-pF capacitor chip as the matching circuit 151, and uses a 2.9-pF capacitor chip as the matching circuit 153.

As illustrated in FIG. 20, as indicated by being enclosed in an elliptic broken line, the total efficiency of the antenna device 100C1 exhibits excellent values of 0 (dB) to −2.5 (dB) when the distance to the metallic conductor is in a range of 1 to 1/8. On the other hand, when the distance to the metallic conductor became less than 1/8, the total efficiency became lower than −5 (dB). Thus, the antenna device 100C1 has excellent communication characteristics in an air distant from the metallic conductor.

The total efficiency of the antenna device 100C2 exhibits excellent values of 0 (dB) to −5 (dB) or less when the distance to the metallic conductor is in a range of 1/16 to 1/32. The total efficiency of the antenna device 100C2 exhibits values of −10 (dB) or less when the distance to the metallic conductor is in a range of 1/4 to 1/16 and when the distance to the metallic conductor is in a range of 1/64 to 1/128. Thus, the antenna device 100C2 has excellent communication characteristics both in the vicinity of the metallic conductor and in an air distant from the metallic conductor.

The total efficiency of the antenna device 100C3 exhibits an excellent value of −5 (dB) when the distance to the metallic conductor is 1/128, as indicated by being enclosed in a broken line circle. The total efficiency of the antenna device 100C3 also exhibits an excellent value of approximately −5 (dB) when the distance to the metallic conductor is 1/64. The total efficiency exhibits a relatively excellent value of approximately −7 (dB) when the distance to the metallic conductor is in a range of 1/16 to 1/32. The total efficiency became lower than −5 (dB) when the distance to the metallic conductor became 1/16 or more. Thus, the antenna device 100C3 has excellent communication characteristics in the vicinity of the metallic conductor.

As illustrated in FIG. 21, as indicated by being enclosed in an elliptic broken line, the actual gain of the antenna device 100C1 exhibits excellent values of approximately 7.5 (dBi) or more when the distance to the metallic conductor is in a range of 1 to 1/8. When the distance to the metallic conductor became less than 1/32, the actual gain became lower than −5 (dBi). Thus, the antenna device 100C1 has excellent communication characteristics in an air distant from the metallic conductor.

The actual gain of the antenna device 100C2 exhibits excellent values of −5 (dBi) or more when the distance to the metallic conductor is in a range of 1 to 1/28. The actual gain exhibits excellent values of 0 (dBi) or more when the distance to the metallic conductor is in a range of 1/8 to 1/100, for example. Thus, the antenna device 100c2 has excellent communication characteristics both in the vicinity of the metallic conductor and in an air distant from the metallic conductor.

The actual gain of the antenna device 100C3 exhibits an excellent value of approximately 4.5 (dBi) when the distance to the metallic conductor is 1/28, as indicated by being enclosed in a broken line circle. The actual gain of the antenna device 100C3 also exhibits an excellent value of approximately 4 (dBi) when the distance to the metallic conductor is 1/64. The actual gain of the antenna device 100C3 on the whole exhibits relatively excellent values of −5 (dBi) or more. Thus, the antenna device 100C3 has excellent communication characteristics in the vicinity of the metallic conductor.

Figure 22:
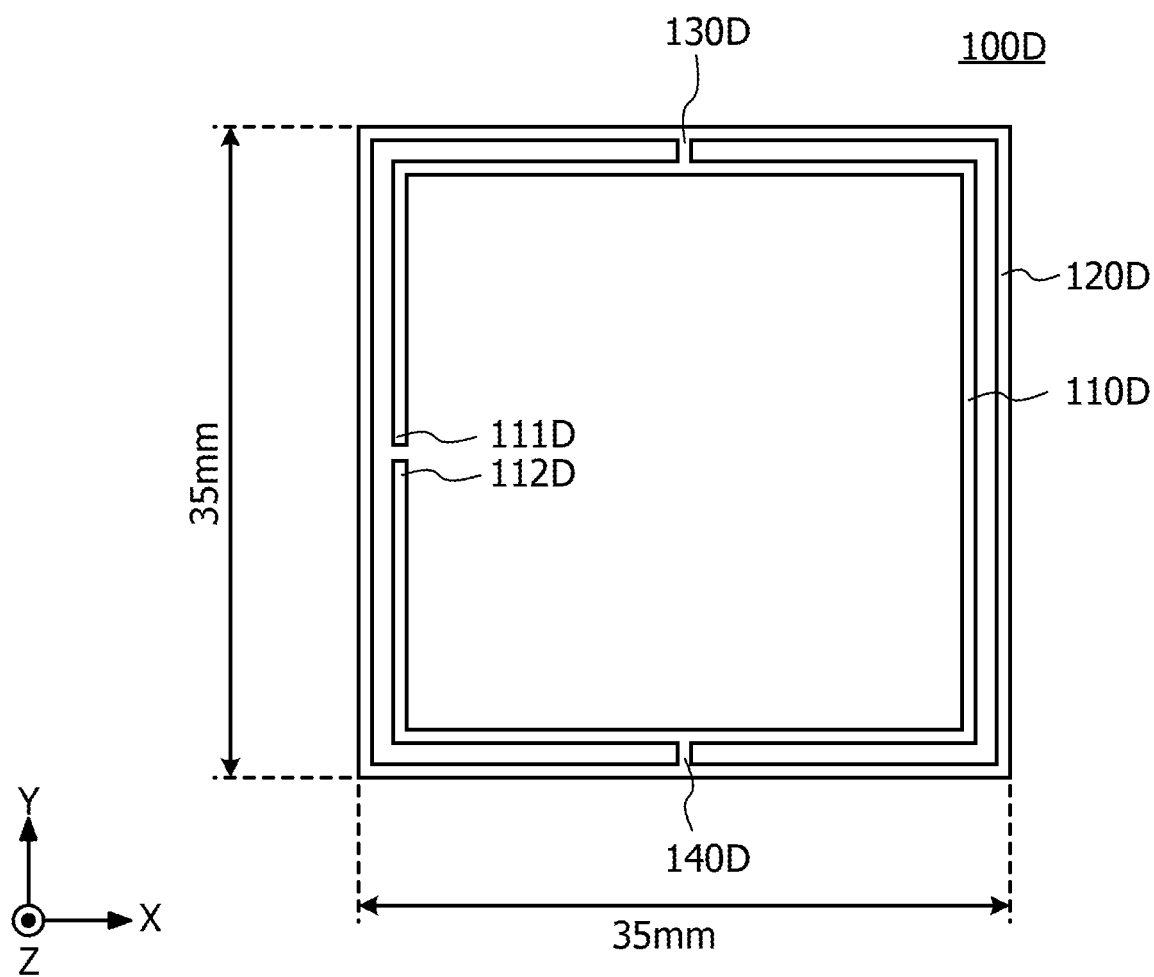
FIG. 22 illustrates an example of an antenna device.

FIG. 22 illustrates an example of an antenna device. An antenna device 100D is formed by modifying the antenna device 100C (see FIG. 16) into a rectangular shape as viewed in plan. The antenna device 100D includes loop antennas 110D and 120D that are rectangular (quadrangular) as viewed in plan. The loop antenna 110D is disposed inside the loop antenna 120D such that centers of the loop antenna 110D and the loop antenna 120D coincide with each other.

The loop antenna 110D includes end portions 111D and 112D serving as a feeding point. The loop antennas 110D and 120D are coupled to each other by connecting portions 130D and 140D. As an example, the length of one side of the loop antenna 120D is 35 mm.

Figure 23:
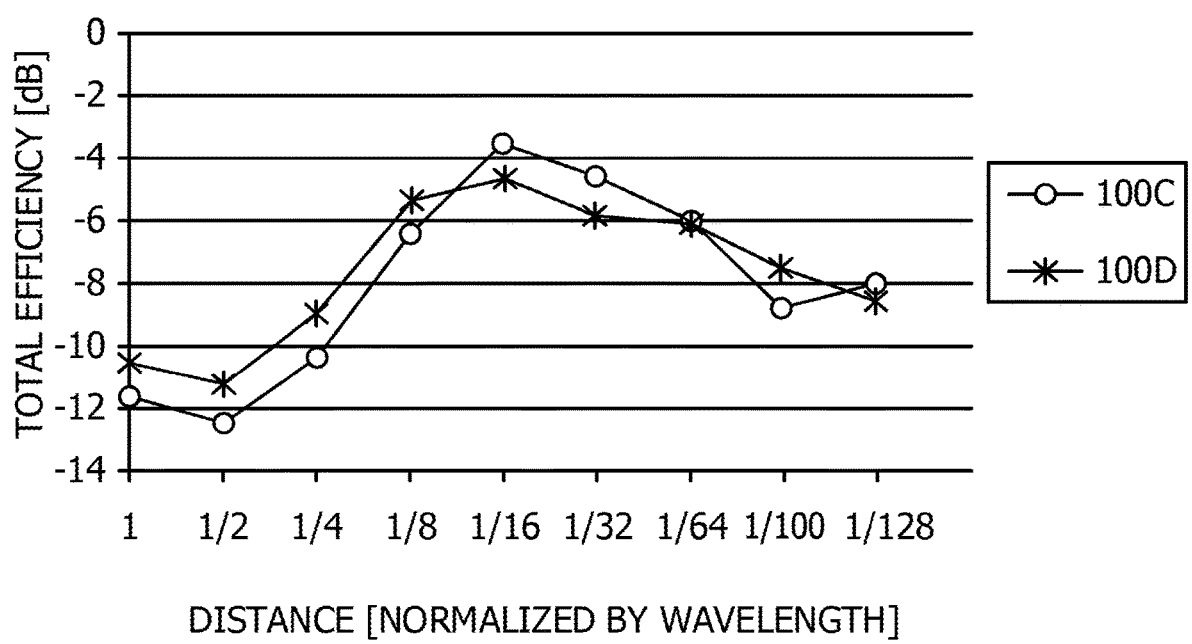
FIG. 23 illustrates an example of a result of simulation of total efficiency of an antenna device.
Figure 24:
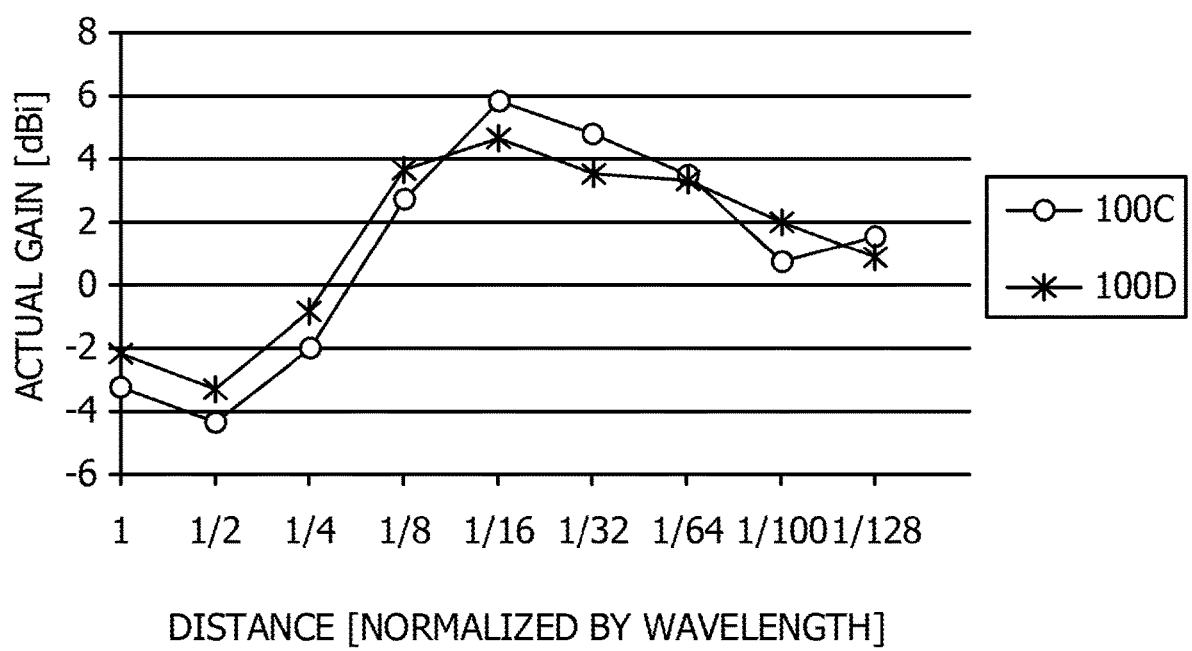
FIG. 24 illustrates an example of a result of simulation of actual gain of an antenna device.

FIG. 23 illustrates an example of a result of simulation of total efficiency of an antenna device. FIG. 24 illustrates an example of a result of simulation of actual gain of an antenna device. Axes of abscissas and axes of ordinates in FIG. 23 and FIG. 24 are similar to those in FIG. 4 and FIG. 5 individually. FIG. 23 and FIG. 24 illustrate results of simulation of characteristics of the total efficiency and the actual gain of the antenna device 100C (see FIG. 16) with respect to a distance to a metallic conductor.

The characteristics of the antenna device 100D are indicated by data points of *, and the characteristics of the antenna device 100C are indicated by circular data points. A 2.3-pF capacitor chip is inserted in series into the loop antenna 110D of the antenna device 100D. This is similar to the insertion between the end portions 113 and 114 in FIG. 1. A 3.6-nH inductor chip was connected between the end portions 111D and 112D of the loop antenna 110D. This inductor chip is coupled in parallel with the loop antenna 110D.

A 2.5-pF capacitor chip is inserted in series with the loop antenna 110C of the antenna device 100C used here. This is similar to the insertion between the end portions 113 and 114 in FIG. 1. A 1.4-pF capacitor chip is coupled between the end portions 111C and 112C of the loop antenna 110C. This capacitor chip is coupled in parallel with the loop antenna 110C.

As illustrated in FIG. 23, the total efficiency of the antenna device 100D is substantially similar to the total efficiency of the antenna device 100C, and exhibits excellent values of −10 (dB) or more over substantially the entire distance range of 1 to $1/128$.

As illustrated in FIG. 24, the actual gain of the antenna device 100D is substantially similar to the actual gain of the antenna device 100C, and exhibits excellent values of −5 (dBi) or more over the entire distance range of 1 to $1/128$.

Therefore, the antenna device 100D including the rectangular loop antennas 110D and 120D has radiation characteristics similar to those of the antenna device 100C including the circular loop antennas 110C and 120C, and provides excellent communication characteristics. Here, while the above description has been made of the antenna device 100D including the loop antennas 110D and 120D of a rectangular shape (quadrangular shape) as an example of a polygon, the loop antennas 110D and 120D may be triangles arranged such that centers thereof are made to coincide with each other and respective sides thereof are parallel with one another, or may be polygons having five angles or more.

Figure 25:
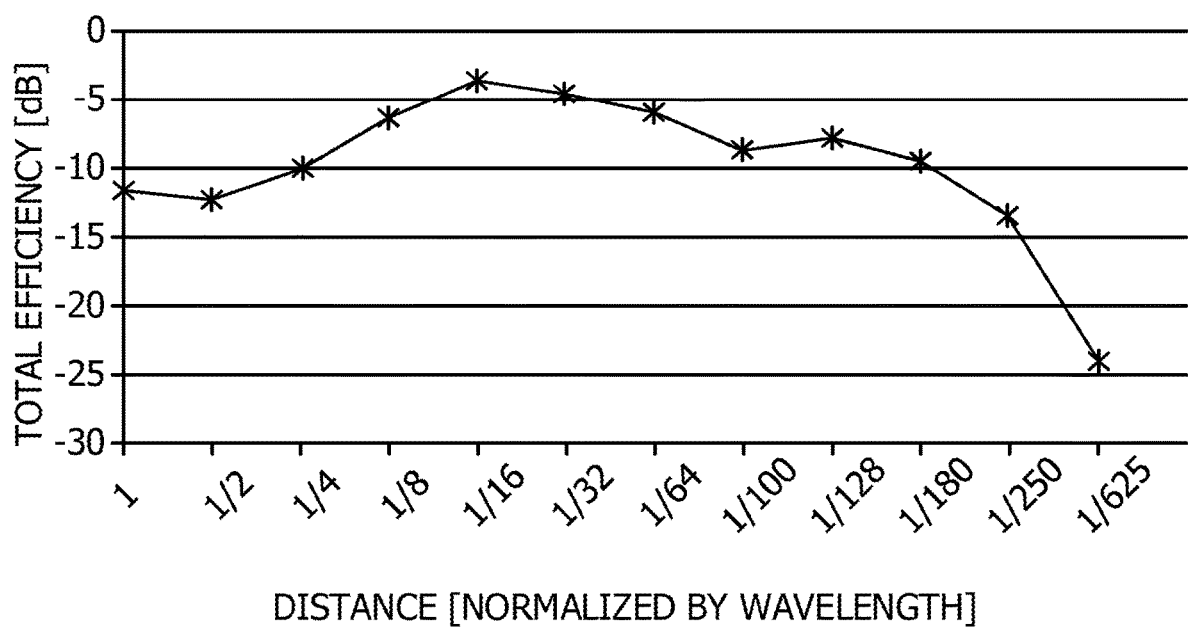
FIG. 25 illustrates an example of a result of simulation of total efficiency of an antenna device.
Figure 26:
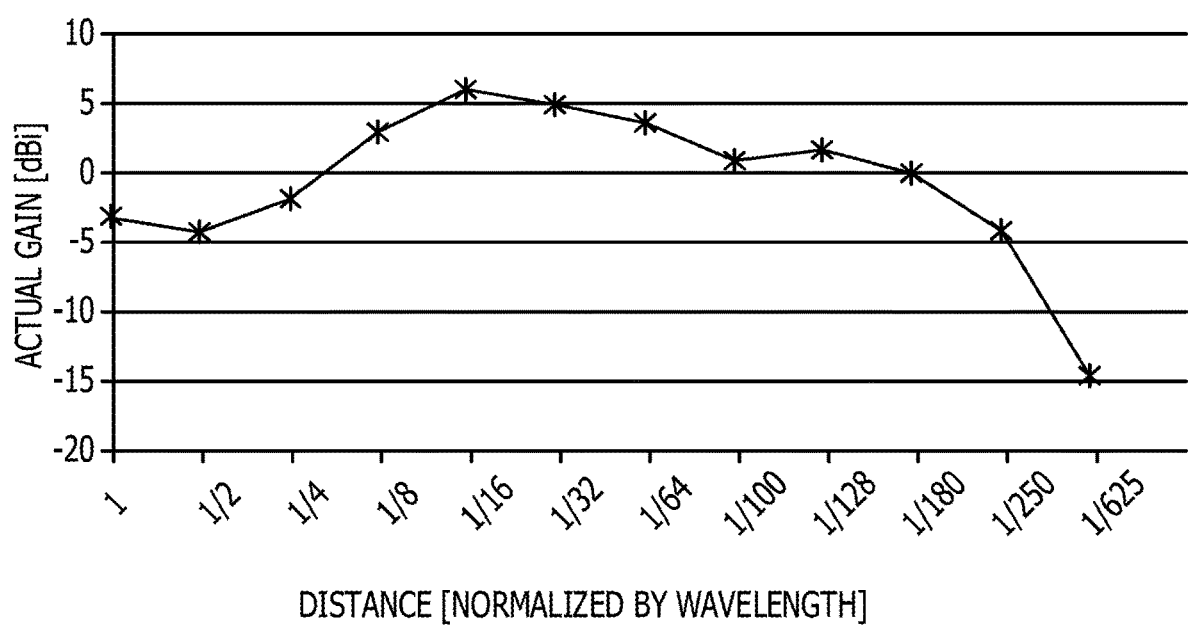
FIG. 26 illustrates an example of a result of simulation of actual gain of an antenna device.

FIG. 25 illustrates an example of a result of simulation of total efficiency of an antenna device. FIG. 26 illustrates a result of simulation of actual gain of an antenna device. FIG. 25 and FIG. 26 illustrate the total efficiency and the actual gain when the distance between the antenna device 100C and the metallic conductor is made even shorter than $1/128$.

As illustrated in FIG. 25, the total efficiency of the antenna device 100C exhibits excellent values of −10 (dB) or more over substantially an entire distance range of 1 to $1/180$. However, the total efficiency of the antenna device 100C decreases when the distance exceeds $1/180$, decreases sharply when the distance further exceeds $1/250$, and is approximately −24 dB when the distance is $1/625$.

As illustrated in FIG. 26, the actual gain of the antenna device 100C exhibits a tendency substantially similar to that of the total efficiency of the antenna device 100C. The actual gain of the antenna device 100C exhibits excellent values of −5 (dBi) or more over an entire distance range of 1 to $1/250$, but decreases to approximately −15 dBi when the distance is $1/625$.

Therefore, a limit where excellent communication characteristics are obtained when the antenna device 100C including the circular loop antennas 110C and 120C approaches the metallic conductor is up to approximately $1/250$ in terms of the distance normalized by the wavelength.

In the case of 2.4 GHz, the length of one wavelength in a vacuum is approximately 125 mm, $1/128$ of the distance normalized by the wavelength is approximately 0.97 mm, $1/180$ of the distance normalized by the wavelength is approximately 0.7 mm, $1/250$ of the distance normalized by the wavelength is approximately 0.5 mm, and $1/625$ of the distance normalized by the wavelength is approximately 0.2 mm. It therefore suffices to set the thickness of the board or the thickness of a protective film disposed on upper surfaces (Z-axis positive direction side) of the loop antennas 110C and 120C to a thickness that makes it possible to obtain excellent communication characteristics.

As described above, the antenna devices 100, 100A, 100B, 100C, 100C2, and 100D are provided from which excellent communication characteristics are obtained even when the antenna devices 100, 100A, 100B, 100C, 100C2, and 100D are disposed in the vicinity of a metallic conductor. The value of the capacitor and/or the inductor of the matching circuit 150 may be adjusted to adjust impedance.

The antenna device 100C1 (see FIG. 20) exhibits excellent communication characteristics at a position somewhat distant from the metallic conductor. The antenna device 100C3 (see FIG. 20) exhibits excellent communication characteristics at a position somewhat close to the metallic conductor. Such communication characteristics may be realized by adjusting the matching circuit 150.

Thus, the antenna devices 100, 100A, 100B, 100C, 100C1, 100C2, 100C3, and 100D (hereinafter referred to as the antenna device 100 and the like) may be provided which exhibit desired communication characteristics according to a distance to a conductor.

The antenna device 100 and the like do not include a ground plane. A patch antenna, for example, includes an antenna element disposed on one surface of a board and a ground plane disposed on another surface of the board. Therefore, when a ground plane side abuts against a metallic conductor, communication characteristics of the patch antenna are hardly affected. However, when an antenna element side abuts against the metallic conductor, the antenna element becomes a state in which the antenna element is sandwiched between the metallic conductor and the ground plane, and therefore it is difficult for the antenna element to communicate.

On the other hand, the antenna device 100 and the like do not include a ground plane, and therefore exhibit excellent communication characteristics when either of surfaces of the antenna device 100 and the like abuts against the metallic conductor. For example, the antenna device 100 and the like maintain excellent communication characteristics even when the antenna device 100 and the like are attached to an IoT sensor device and randomly disposed in various locations.

The loop antenna 110 and the like of the antenna device 100 and the like are linear antenna elements, and therefore easily adapt to a three-dimensionally bending configuration. Therefore, the loop antenna 110 and the like of the antenna device 100 and the like may be affixed to various parts of various devices or metallic members or the like.

The loop antenna 110 and the like of the antenna device 100 and the like are linear antenna elements. Therefore, when attached to a member that enters a field of view of a human such as a glass of an automobile, for example, the loop antenna 110 and the like of the antenna device 100 and the like may be attached in an inconspicuous configuration without blocking the field of view.

By adjusting the impedance of the matching circuit 150 of the antenna device 100 and the like, it is possible to perform frequency tuning and/or impedance adjustment without changing the shape and/or length or the like of the loop antenna 110 and the like and the loop antenna 120 and the like.

The antenna device 100 and the like may use the loop antenna 110 and the like and the loop antenna 120 and the like having a very small thickness. Therefore, even when the antenna device 100 and the like are attached to various devices or members or the like, the shape and external dimensions of the devices or the members hardly change. Thus, the antenna device 100 and the like may be used for various purposes.

As in the antenna devices 100C1, 100C2, and 100C3 (see FIG. 19 and FIG. 20), the adjustment of the inductance or capacitance of the matching circuits 151, 152, and 153 may freely set excellent communication characteristics (antenna device 100C1) in an air distant from the metallic conductor, excellent communication characteristics (antenna device 100C3) in the vicinity of the metallic conductor, and excellent communication characteristics (antenna device 100C2) both in the vicinity of the metallic conductor and in an air distant from the metallic conductor.

In the foregoing, the lengths of the loop antennas 110, 110C, and 110D and the loop antennas 120, 120C, and 120D are set at lengths corresponding to the electrical length of one wavelength at the communication frequency (2.4 GHz). When the communication frequency is a frequency other than 2.4 GHz, for example, the lengths may be set at lengths corresponding to the electrical length of one wavelength at the frequency.

In the foregoing, the lengths of the loop antennas 110, 110C, and 110D and the loop antennas 120, 120C, and 120D are set at lengths corresponding to the electrical length of one wavelength at the communication frequency. The lengths may, for example, be set at lengths corresponding to the electrical length of N wavelengths at the communication frequency. N is an integer of 1 or more.

In the foregoing, the connecting portions 130 and 140 are coupled to the loop antenna 110 at the connection points 115 and 116, and coupled to the loop antenna 120 at the connection points 121 and 122.

The connection points 115 and 116 are located at positions of lengths corresponding to the electrical length of a quarter wavelength at the communication frequency (2.4 GHz) from the end portions 111 and 112 of the loop antenna 110. The positions in the X-axis direction of the connection points 121 and 122 are substantially equal to those of the connection points 115 and 116, and the connection points 121 and 122 are located at positions of lengths corresponding to the electrical length of a quarter wavelength at the communication frequency (2.4 GHz) from the corresponding points 123 and 124.

When N is 2, for example, the lengths of the loop antennas 110, 110C, and 110D and the loop antennas 120, 120C, and 120D are set at lengths corresponding to the electrical length of two wavelengths at the communication frequency. In this case, it suffices for the positions of the connection points 115 and 116 to be positions of lengths corresponding to M times the electrical length of a quarter wavelength at the communication frequency (2.4 GHz) from the end portions 111 and 112 of the loop antenna 110. M is 1, 2, or 3. Similarly, it suffices for the connection points 121 and 122 to be positions of lengths corresponding to M times the electrical length of a quarter wavelength at the communication frequency (2.4 GHz) from the corresponding point 123. M is 1, 2, or 3.

When N is 3, for example, the lengths of the loop antennas 110, 110C, and 110D and the loop antennas 120, 120C, and 120D are set at lengths corresponding to the electrical length of three wavelengths at the communication frequency. In this case, it suffices for M to be 1, 2, 3, 4, or 5. Similarly, it suffices for the connection points 121 and 122.

In addition to the antenna devices 100, 100A, 100B, 100C, and 100D described above, modifications may be made as illustrated in FIGS. 27 to 30. FIGS. 27 to 30 illustrate an example of antenna devices. In FIGS. 27 to 30, a symbol of alternating current is depicted at a part at which a pair of end portions serving as a feeding point is located.

Figure 27:
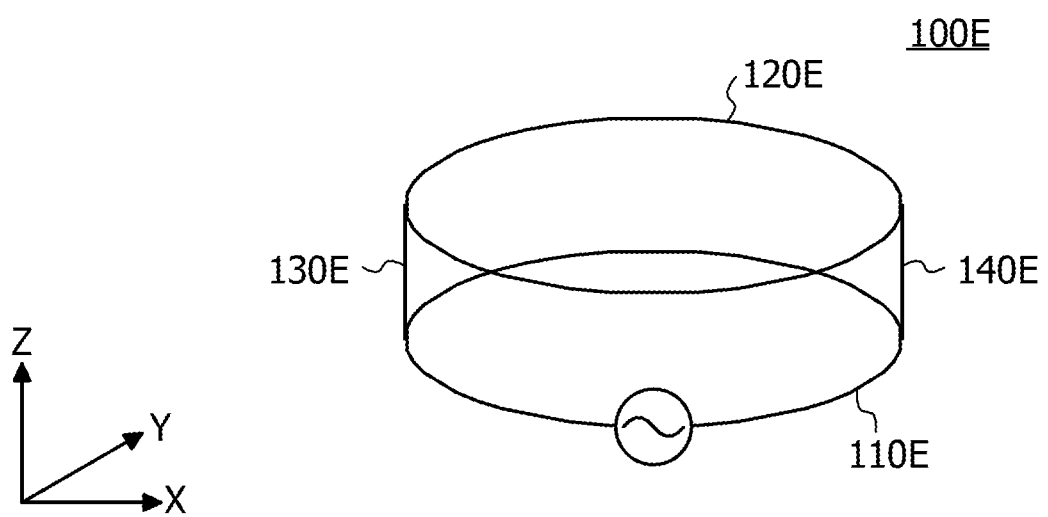
FIG. 27 illustrates an example of an antenna device.

As illustrated in FIG. 27, an antenna device 100E includes circular loop antennas 110E and 120E. The loop antennas 110E and 120E have diameters substantially equal to each other, and are coupled to each other by connecting portions 130E and 140E extending in a Z-axis direction in a state in which centers of the loop antennas 110E and 120E coincide with each other as viewed in plan. A feeding point is provided to the loop antenna 110E.

In such an antenna device 100E, it suffices, for example, to dispose the loop antenna 110E on one surface of a board, dispose the loop antenna 120E on another surface of the board, and realize the connecting portions 130E and 140E by vias penetrating the board.

Figure 28:
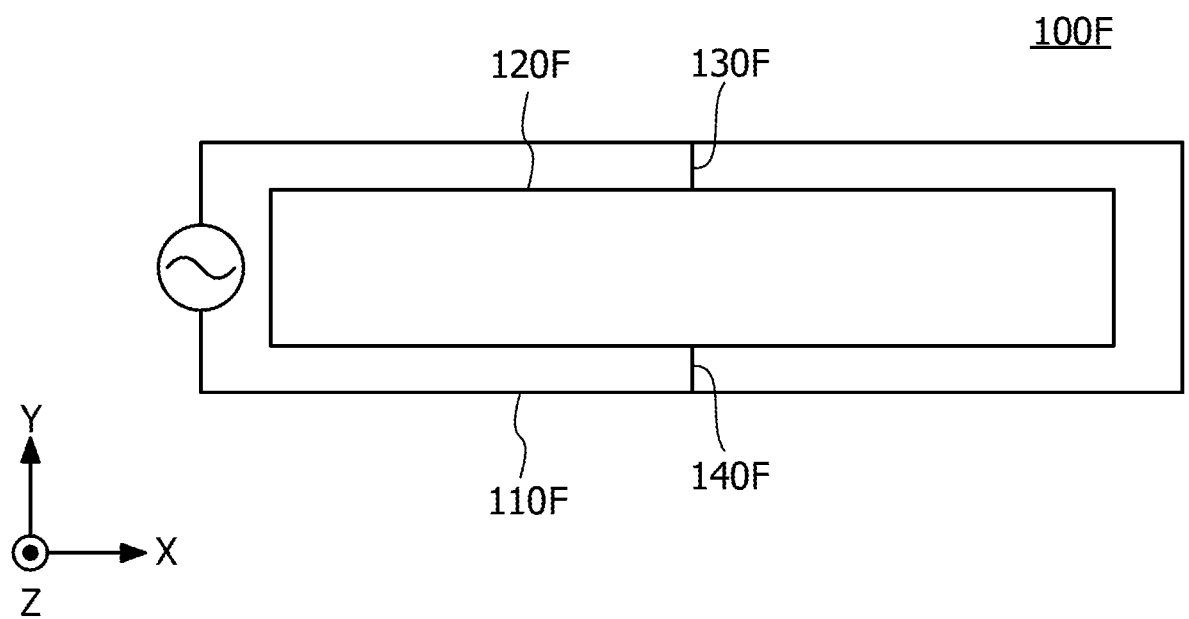
FIG. 28 illustrates an example of an antenna device.

As illustrated in FIG. 28, an antenna device 100F includes loop antennas 110F and 120F having a rectangular shape as viewed in plan. The loop antenna 110F having a feeding point is positioned on the outside of the loop antenna 120F, and is coupled to the loop antenna 120F by connecting portions 130F and 140F in a state in which centers of the loop antennas 110F and 120F coincide with each other. Such an antenna device 100F may be disposed on one surface of a board.

Figure 29:
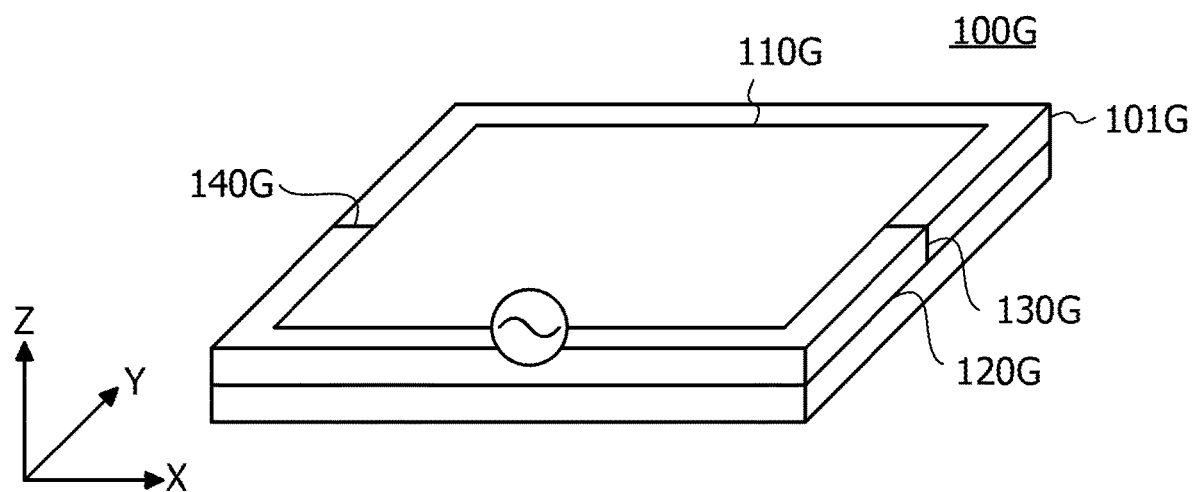
FIG. 29 illustrates an example of an antenna device.

As illustrated in FIG. 29, an antenna device 100G includes loop antennas 110G and 120G, connecting portions 130G and 140G, and a board 101G. The board 101G is similar to the board 101 illustrated in FIG. 1.

The loop antenna 110G that has a feeding point and is of a rectangular shape is disposed on a top surface on a Z-axis positive direction side of the board 101G, and the loop antenna 120G of a rectangular shape is disposed on a side surface of the board 101G. The loop antennas 110G and 120G are coupled to each other by the connecting portions 130G and 140G. The loop antenna 120G may be thus disposed on the side surface of the board 101G. In addition, the positions of the loop antennas 110G and 120G may be interchanged, and the loop antenna 110G having the feeding point may be disposed on the side surface of the board 101G.

Figure 30:
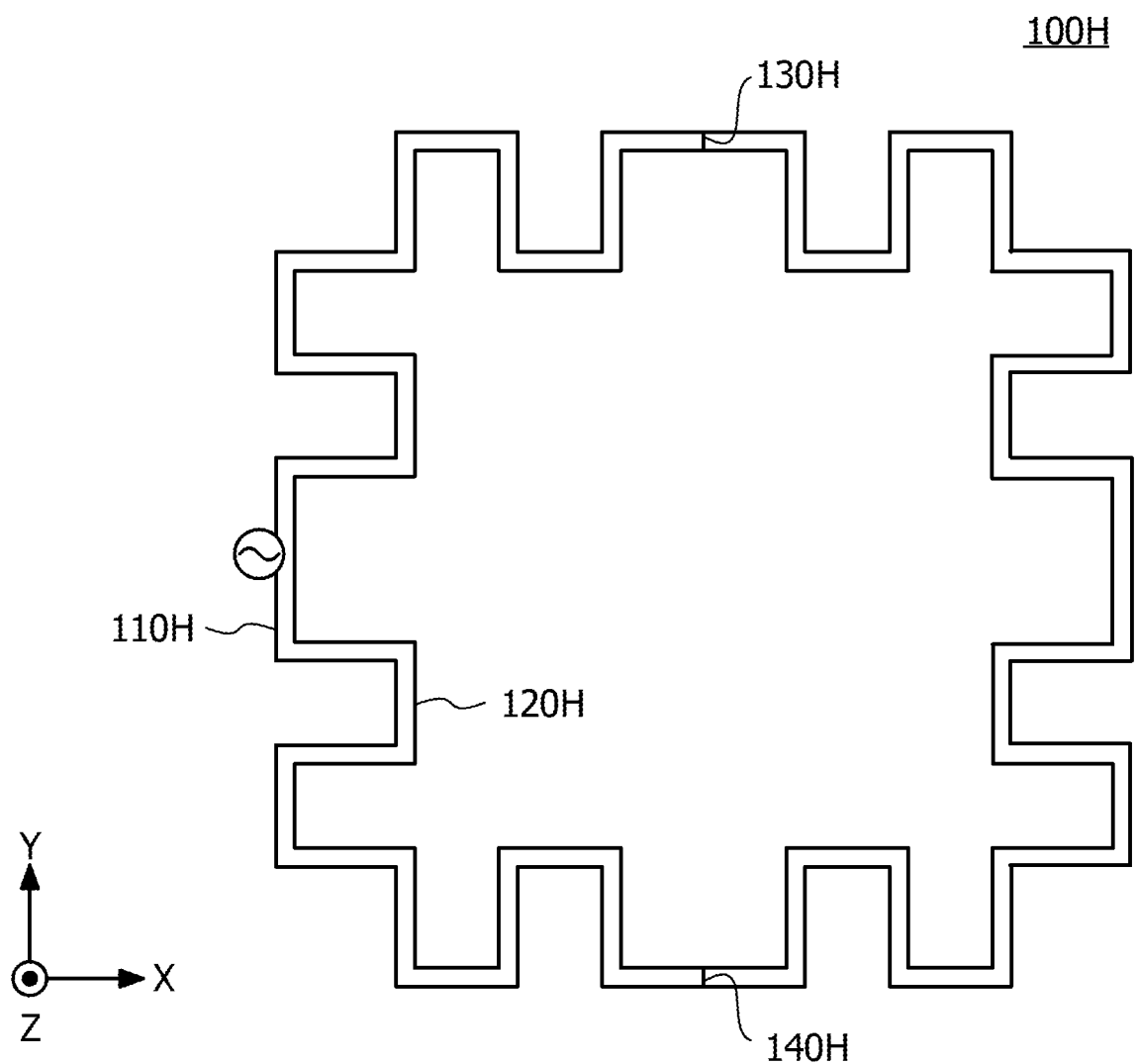
FIG. 30 illustrates an example of an antenna device.

As illustrated in FIG. 30, an antenna device 100H includes loop antennas 110H and 120H and connecting portions 130H and 140H. The loop antennas 110H and 120H have a rectangularly annular shape as viewed in plan, and each side of the loop antennas 110H and 120H is repeatedly bent in a meandering manner. The loop antenna 110H having a feeding point is, as an example, disposed on the outside of the loop antenna 120H. Such an antenna device 100H may be disposed on one surface of a board.

The above-described antenna devices 100, 100A, 100B, 100C, 100C1, 100C2, 100C3, 100D, 100E, 100F, 100G, and 100H may be attached to an electronic apparatus including a communicating unit.

Figure 31:
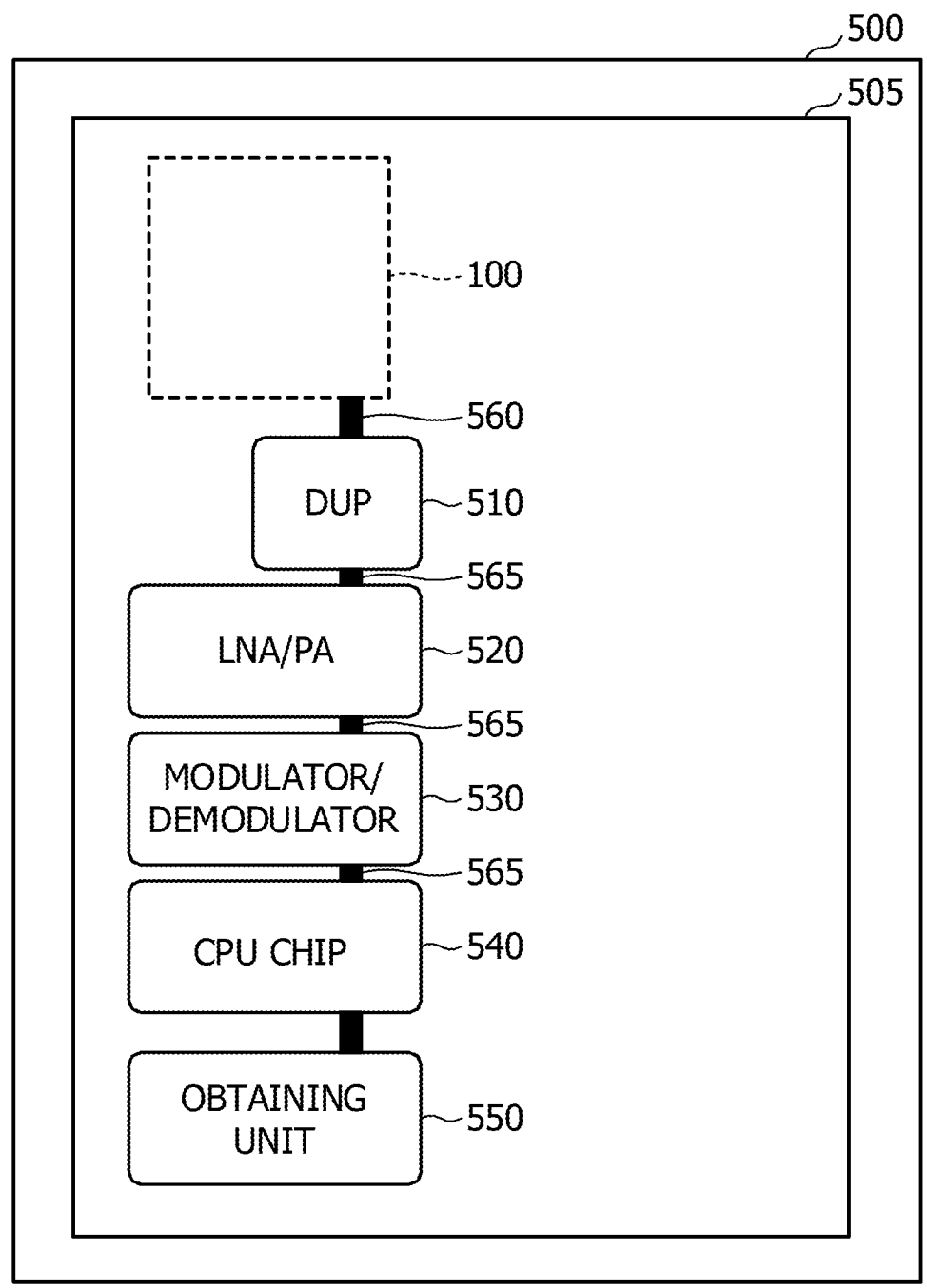
FIG. 31 illustrates an example of an electronic apparatus.

FIG. 31 illustrates an example of an electronic apparatus. An electronic apparatus 500 includes a wiring board 505, an antenna device 100, a duplexer (DUP) 510, a low noise amplifier (LNA)/power amplifier (PA) 520, a modulator/demodulator 530, a central processing unit (CPU) chip 540, and an obtaining unit 550.

The wiring board 505 is disposed inside a casing of the electronic apparatus 500. The DUP 510, the LNA/PA 520, the modulator/demodulator 530, the CPU chip 540, and the obtaining unit 550 are mounted on the wiring board 505.

The antenna device 100 may be disposed on a surface of the wiring board 505 on which surface the DUP 510, the LNA/PA 520, the modulator/demodulator 530, the CPU chip 540, and the obtaining unit 550 are mounted, or may be disposed on a surface on an opposite side.

The antenna device 100 is coupled to the DUP 510. The DUP 510, the LNA/PA 520, the modulator/demodulator 530, and the CPU chip 540 are coupled to one another via wiring 565. The obtaining unit 550 is coupled to the CPU chip 540.

The DUP 510 performs switching to transmission or reception of the antenna device 100. The DUP 510 has a function as a filter. The LNA/PA 520 amplifies power of a transmission wave and a received wave. The modulator/demodulator 530 modulates the transmission wave and demodulates the received wave. The CPU chip 540 has a function as a communication processor performing communication processing of the tablet computer 500 and a function as an application processor executing an application program. The CPU chip 540 includes an internal memory that stores data to be transmitted or received data or the like.

Wiring 560 and the wiring 565 are, for example, formed by patterning a copper foil on the top surface of the wiring board 505. In a case where the antenna device 100 is disposed on the same surface as the pieces of wiring 560 and 565, the loop antennas 110 and 120 and the connecting portions 130 and 140 may be formed by patterning one sheet of copper foil. In addition, though not illustrated in FIG. 31, a matching circuit for adjusting an impedance characteristic is provided between the antenna device 100 and the DUP 510.

The obtaining unit 550 is an example of an information obtaining unit that obtains information about an ambience of the electronic apparatus 500. The obtaining unit 550 may be various units such as a sensor obtaining (detecting) information such as an atmospheric temperature, humidity, or the like, a camera obtaining an image as information, and the like. In addition, in a case where the electronic apparatus 500 is of a wearable type, and is attached to a human body, the obtaining unit 550 may be a sensor detecting information to 30. FIGS. 27 to 30 illustrate an example of antenna devices Such an electronic apparatus 500 may be used as a sensor device or an image obtaining device for IoT or the like. It suffices to optimize the impedance of the loop antennas 110 and 120 by the matching circuit 150 of the antenna device 100 according to a use of the electronic apparatus 500 or the like, and then implement the antenna device 100 in the electronic apparatus 500.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An antenna device comprising:
a first loop antenna including a first end portion and a second end portion that are fed, having a first length corresponding to N (N is an integer of 1 or more) times a wavelength at a communication frequency and having a continuous circular or polygonal shape;
a second loop antenna having a second length corresponding to N times the wavelength and having a continuous circular or polygonal shape;
a first connecting conductor configured to couple the first loop antenna and the second loop antenna to each other at a first position of a third length corresponding to M (M is an integer of 1 or more) times a quarter wavelength at the communication frequency from the first end portion of the first loop antenna; and
a second connecting conductor configured to couple the first loop antenna and the second loop antenna to each other at a second position of the third length from the second end portion of the first loop antenna and different from the first position,
the first loop antenna, the second loop antenna, the first connecting conductor and the second connecting conductor are provided on a substrate to be in contact with a planar surface of the substrate,
the first loop antenna and the second loop antenna are arranged with centers of the first loop antenna and the second loop antenna coinciding with each other, the first connecting conductor and the second connecting conductor extend from the first loop antenna to the second loop antenna towards the centers, and the first connecting conductor and the second connecting conductor are arranged symmetrically across the centers.

2. The antenna device according to claim 1, wherein the first loop antenna and the second loop antenna are arranged in proximity to each other.

3. The antenna device according to claim 1, wherein the first loop antenna is broken between end portions and the end portions are coupled by a matching circuit.

4. The antenna device according to claim 1, wherein the first loop antenna and the second loop antenna are arranged on an identical plane, and the first loop antenna is disposed outward or inward of the second loop antenna.

5. The antenna device according to claim 1, wherein the first loop antenna and the second loop antenna are arranged on two respective planes parallel with each other.

6. The antenna device according to claim 5, wherein the first length is equal to the second length.

7. The antenna device according to claim 1, wherein a first connection point which couples the second loop antenna and the first connecting conductor to each other and a second connection point which couples the second loop antenna and the second connecting conductor to each other are arranged at axisymmetric positions with a straight line which passes through a middle point between the first end portion and the second end portion and a center of the first loop antenna as an axis of symmetry.

8. The antenna device according to claim 1, further comprising:
a board on which the first loop antenna and the second loop antenna are arranged.

9. The antenna device according to claim 1, wherein the M is 1 when the N is 1, the M is 1, 2, or 3 when the N is 2, and the M is 1, 2, 3, 4, or 5 when the N is 3.

10. An electronic apparatus comprising:
an antenna device;
an information obtaining device configured to obtain information; and
a communicating device configured to communicate with another apparatus via a network through the antenna device, and transmit information obtained by the information obtaining device to the other apparatus, wherein the antenna device includes:
a first loop antenna including a first end portion and a second end portion that are fed, having a first length corresponding to N (N is an integer of 1 or more) times a wavelength at a communication frequency and having a continuous circular or polygonal shape;
a second loop antenna having a second length corresponding to N times the wavelength and having a continuous circular or polygonal shape;
a first connecting conductor configured to couple the first loop antenna and the second loop antenna to each other at a first position of a third length corresponding to M (M is an integer of 1 or more) times a quarter wavelength at the communication frequency from the first end portion of the first loop antenna; and
a second connecting conductor configured to couple the first loop antenna and the second loop antenna to each other at a second position of the third length from the second end portion of the first loop antenna and different from the first position,
the first loop antenna, the second loop antenna, the first connecting conductor and the second connecting conductor are provided on a substrate to be in contact with a planar surface of the substrate,
the first loop antenna and the second loop antenna are arranged with centers of the first loop antenna and the second loop antenna coinciding with each other,
the first connecting conductor and the second connecting conductor extend from the first loop antenna to the second loop antenna towards the centers, and
the first connecting conductor and the second connecting conductor are arranged symmetrically across the centers.

11. The electronic apparatus according to claim 10, wherein the first loop antenna and the second loop antenna are arranged in proximity to each other.

12. The electronic apparatus according to claim 10, wherein the first loop antenna is broken between end portions and the end portions are coupled by a matching circuit.

13. The electronic apparatus according to claim 10, wherein the first loop antenna and the second loop antenna are arranged on an identical plane, and the first loop antenna is disposed outward or inward of the second loop antenna.

14. The electronic apparatus according to claim 10, wherein the first loop antenna and the second loop antenna are arranged on two respective planes parallel with each other.

15. The electronic apparatus according to claim 14, wherein the first length is equal to the second length.

16. The electronic apparatus according to claim 10, wherein a first connection point which couples the second loop antenna and the first connecting conductor to each other and a second connection point which couples the second loop antenna and the second connecting conductor to each other are arranged at axisymmetric positions with a straight line which passes through a middle point between the first end portion and the second end portion and a center of the first loop antenna as an axis of symmetry.

17. The electronic apparatus according to claim 10, wherein the antenna device includes: a board on which the first loop antenna and the second loop antenna are arranged.

18. The electronic apparatus according to claim 10, wherein the M is 1 when the N is 1, the M is 1, 2, or 3 when the N is 2, and the M is 1, 2, 3, 4, or 5 when the N is 3.

* * * * *